(12) United States Patent
Click et al.

(10) Patent No.: US 11,834,363 B2
(45) Date of Patent: Dec. 5, 2023

(54) METHODS FOR CERAMMING GLASS WITH NUCLEATION AND GROWTH DENSITY AND VISCOSITY CHANGES

(71) Applicant: CORNING INCORPORATED, Corning, NY (US)

(72) Inventors: Carol Ann Click, Corning, NY (US); Indrajit Dutta, Horseheads, NY (US); Ozgur Gulbiten, Painted Post, NY (US); Jill Marie Hall, Elmira, NY (US); Mathieu Gerard Jacques Hubert, Corning, NY (US); Andrew Peter Kittleson, Honeoye Falls, NY (US); Rohit Rai, Painted Post, NY (US); John Robert Saltzer, Jr., Beaver Dams, NY (US); Matthew Daniel Trosa, Horseheads, NY (US); Zheming Zheng, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 216 days.

(21) Appl. No.: 16/511,171

(22) Filed: Jul. 15, 2019

(65) Prior Publication Data

US 2020/0017395 A1  Jan. 16, 2020

Related U.S. Application Data

(60) Provisional application No. 62/769,253, filed on Nov. 19, 2018, provisional application No. 62/698,623, filed on Jul. 16, 2018.

(51) Int. Cl.
C03B 32/02 (2006.01)
(52) U.S. Cl.
CPC .................................. *C03B 32/02* (2013.01)

(58) Field of Classification Search
None
See application file for complete search history.

(56) References Cited

U.S. PATENT DOCUMENTS 2,920,971 A    1/1960  Stookey
3,129,087 A *  4/1964  Hagy ..................... C03B 32/02
                                                       65/29.17
(Continued)

FOREIGN PATENT DOCUMENTS

CN    1367149 A    9/2002
CN    1575265 A    2/2005
(Continued)

OTHER PUBLICATIONS

Dai Densification and crystallization in crystallizable low temperature cofired ceramics (Year: 2012).*
(Continued)

*Primary Examiner* — Jodi C Franklin
(74) *Attorney, Agent, or Firm* — Travis B. Gasa; Jeffrey A. Schmidt

(57) ABSTRACT

A method for ceramming a glass article to a glass-ceramic includes placing a glass article into a heating apparatus, and heating the glass article to a first hold temperature at a first predetermined heating rate. The glass article is held at the first hold temperature for a first predetermined duration. The viscosity of the glass article is maintained within log viscosity ±1.0 poise during the first predetermined duration. The glass article is then heated from the first hold temperature to a second hold temperature at a second predetermined heating rate. The glass article is held at the second hold temperature for a second duration. A density of the glass article is monitored from the heating of the glass article from the first hold temperature through the second duration, and the second duration is ended when an absolute value of a (Continued)

density rate of change of the glass article is less than or equal to 0.10 (g/cm$^3$)/min.

20 Claims, 16 Drawing Sheets

(56) References Cited

U.S. PATENT DOCUMENTS

| | | | |
|---|---|---|---|
| 3,617,317 A * | 11/1971 | Sack | C03C 10/0027 501/70 |
| 3,809,543 A | 5/1974 | Gaskell et al. | |
| 3,809,599 A * | 5/1974 | Pei | C03B 11/06 428/34.4 |
| 3,817,732 A * | 6/1974 | Pei | F04D 29/406 65/33.8 |
| 3,931,438 A * | 1/1976 | Beall | C03B 17/02 428/218 |
| 3,972,704 A * | 8/1976 | Loxley | C03B 19/06 65/157 |
| 4,042,362 A | 8/1977 | MacDowell et al. | |
| 4,191,583 A | 3/1980 | Armistead et al. | |
| 4,219,344 A | 8/1980 | Armistead et al. | |
| 4,222,760 A | 9/1980 | Chyung et al. | |
| 4,248,925 A * | 2/1981 | Ambrogi | A47J 36/04 428/212 |
| 4,274,857 A | 6/1981 | Wolfe | |
| 4,391,914 A | 7/1983 | Beall | |
| 4,786,305 A | 11/1988 | Ball et al. | |
| 4,910,638 A | 3/1990 | Berghout et al. | |
| 4,940,674 A | 7/1990 | Beall et al. | |
| 5,030,433 A | 7/1991 | Mehrotra | |
| 5,073,181 A | 12/1991 | Foster et al. | |
| 5,147,436 A | 9/1992 | Blakeslee et al. | |
| 5,296,294 A | 3/1994 | Suzuki et al. | |
| 5,389,582 A * | 2/1995 | Loxley | C03B 32/02 432/262 |
| 5,588,979 A * | 12/1996 | Miyazaki | C03B 11/02 65/355 |
| 5,603,147 A | 2/1997 | Bischoff et al. | |
| 5,680,685 A | 10/1997 | Bischoff | |
| 5,814,262 A | 9/1998 | Ketcham et al. | |
| 5,836,760 A | 11/1998 | Turner et al. | |
| 5,872,069 A | 2/1999 | Abe | |
| 6,055,151 A | 4/2000 | Tormey et al. | |
| 6,374,640 B1 | 4/2002 | Fotheringham et al. | |
| 6,408,813 B1 | 6/2002 | Wilksch et al. | |
| 6,409,813 B1 | 6/2002 | Beesabathina et al. | |
| 6,410,892 B1 | 6/2002 | Peschl et al. | |
| 6,852,569 B2 | 2/2005 | Nakano et al. | |
| 7,054,136 B2 | 5/2006 | Ritter et al. | |
| 7,125,320 B1 | 10/2006 | Brown et al. | |
| 7,312,154 B2 | 12/2007 | Cites et al. | |
| 7,410,716 B2 | 8/2008 | Garner et al. | |
| 7,589,038 B2 | 9/2009 | Goto et al. | |
| 7,618,843 B2 | 11/2009 | Nakano et al. | |
| 8,854,623 B2 | 10/2014 | Fontaine et al. | |
| 9,126,859 B2 | 9/2015 | Nakane et al. | |
| 9,156,726 B2 | 10/2015 | Katayama et al. | |
| 9,260,337 B2 | 2/2016 | Abramov et al. | |
| 9,260,342 B2 | 2/2016 | Borczuch-Laczka et al. | |
| 9,382,603 B2 | 7/2016 | Kimura et al. | |
| 9,604,871 B2 | 3/2017 | Amin et al. | |
| 9,701,569 B2 | 7/2017 | Demartino et al. | |
| 9,809,488 B2 | 11/2017 | Beall et al. | |
| 10,046,542 B2 | 8/2018 | Adib et al. | |
| 2001/0022705 A1 * | 9/2001 | Mori | G11B 5/8404 360/135 |
| 2003/0100146 A1 | 5/2003 | Nakano et al. | |
| 2004/0053039 A1 | 3/2004 | Ekstrom et al. | |
| 2005/0016214 A1 * | 1/2005 | Hsu | C03B 32/02 65/29.21 |
| 2005/0199331 A1 | 9/2005 | Nakano et al. | |
| 2006/0026994 A1 | 2/2006 | Yoshizawa | |
| 2006/0093884 A1 | 5/2006 | Seabaugh et al. | |
| 2006/0185335 A1 | 8/2006 | Ichikawa | |
| 2007/0051301 A1 | 3/2007 | Hirooka | |
| 2007/0199348 A1 | 8/2007 | Gudgel et al. | |
| 2008/0041107 A1 * | 2/2008 | Hsu | C03B 13/04 65/33.9 |
| 2008/0248316 A1 | 10/2008 | Goto et al. | |
| 2009/0162608 A1 | 6/2009 | Yagi et al. | |
| 2009/0186489 A1 | 7/2009 | Nakamura et al. | |
| 2009/0323157 A1 | 12/2009 | Valentin et al. | |
| 2010/0069218 A1 * | 3/2010 | Baldi | C03B 32/02 501/4 |
| 2010/0116413 A1 | 5/2010 | Tanaka et al. | |
| 2010/0304953 A1 | 12/2010 | Liu et al. | |
| 2011/0009254 A1 * | 1/2011 | Schweiger | C03C 17/02 501/2 |
| 2011/0092353 A1 | 4/2011 | Amin et al. | |
| 2011/0186431 A1 | 8/2011 | Horisaka et al. | |
| 2011/0189440 A1 * | 8/2011 | Appleby | B29C 33/301 428/156 |
| 2011/0198785 A1 | 8/2011 | Kester et al. | |
| 2012/0094079 A1 * | 4/2012 | Gabel | C03C 10/0027 428/157 |
| 2012/0196735 A1 * | 8/2012 | Bogaerts | C03C 4/005 501/32 |
| 2012/0291493 A1 * | 11/2012 | Hsu | C03B 32/02 65/33.9 |
| 2013/0164509 A1 | 6/2013 | Siebers et al. | |
| 2013/0277613 A1 | 10/2013 | Miyagawa et al. | |
| 2013/0338267 A1 * | 12/2013 | Appleby | B29C 33/301 523/458 |
| 2014/0050659 A1 * | 2/2014 | Rimer | C01B 39/52 423/700 |
| 2014/0066285 A1 * | 3/2014 | Beall | C03C 3/097 501/32 |
| 2014/0124777 A1 | 5/2014 | Nakatani et al. | |
| 2014/0134397 A1 | 5/2014 | Amin et al. | |
| 2014/0141960 A1 | 5/2014 | Borczuch-Laczka et al. | |
| 2014/0309793 A1 | 10/2014 | Cheng et al. | |
| 2014/0345328 A1 | 11/2014 | Folgar | |
| 2015/0064474 A1 * | 3/2015 | Dejneka | C03C 10/00 501/63 |
| 2015/0086794 A1 | 3/2015 | Akita et al. | |
| 2015/0099124 A1 | 4/2015 | Beunet et al. | |
| 2015/0113801 A1 | 4/2015 | Cao et al. | |
| 2015/0140274 A1 | 5/2015 | Burke et al. | |
| 2015/0140513 A1 * | 5/2015 | Burke | C03C 3/097 433/202.1 |
| 2015/0239772 A1 * | 8/2015 | Baker | C03C 10/0054 428/410 |
| 2015/0265975 A1 | 9/2015 | Liu et al. | |
| 2015/0274581 A1 * | 10/2015 | Beall | C03C 10/0054 501/4 |
| 2015/0274602 A1 | 10/2015 | Ishii et al. | |
| 2015/0291468 A1 | 10/2015 | Boek et al. | |
| 2015/0329413 A1 | 11/2015 | Beall et al. | |
| 2015/0376055 A1 | 12/2015 | Fu et al. | |
| 2016/0002092 A1 | 1/2016 | Kuehn | |
| 2016/0031736 A1 * | 2/2016 | Muehlke | C03B 23/03 428/172 |
| 2016/0046520 A1 * | 2/2016 | Chenu | C03C 10/00 501/32 |
| 2016/0102010 A1 * | 4/2016 | Beall | C03C 21/002 501/4 |
| 2016/0102014 A1 | 4/2016 | Hu et al. | |
| 2016/0130175 A1 | 5/2016 | Siebers et al. | |
| 2016/0159682 A1 | 6/2016 | Borczuch-Laczka et al. | |
| 2016/0176752 A1 | 6/2016 | Gabel et al. | |
| 2016/0194235 A1 | 7/2016 | Hart et al. | |
| 2016/0280589 A1 | 9/2016 | Beall et al. | |
| 2017/0022093 A1 | 1/2017 | Demartino et al. | |
| 2017/0144921 A1 | 5/2017 | Beall et al. | |
| 2017/0340420 A1 | 11/2017 | Burke et al. | |
| 2018/0002227 A1 | 1/2018 | Dai et al. | |
| 2018/0097142 A1 | 4/2018 | Moriyama et al. | |
| 2018/0155235 A1 | 6/2018 | Beall et al. | |
| 2018/0169826 A1 | 6/2018 | Bankaitis et al. | |
| 2018/0182549 A1 | 6/2018 | Koide et al. | |
| 2018/0210118 A1 | 7/2018 | Gollier et al. | |

(56) References Cited

U.S. PATENT DOCUMENTS

| | | | |
|---|---|---|---|
| 2018/0272783 A1 | 9/2018 | Ishihara | |
| 2018/0362390 A1* | 12/2018 | Claireaux | ............ B32B 17/1011 |
| 2018/0370194 A1* | 12/2018 | Claireaux | ............... C03C 3/085 |
| 2018/0370846 A1* | 12/2018 | Harrison | .................. C23C 16/40 |
| 2019/0169060 A1* | 6/2019 | Jones | ....................... C03B 32/02 |
| 2019/0169061 A1* | 6/2019 | Jones | ....................... H05K 5/03 |
| 2019/0194062 A1 | 6/2019 | Wlfinger et al. | |
| 2019/0300426 A1 | 10/2019 | Fu et al. | |
| 2020/0017398 A1 | 1/2020 | Click et al. | |
| 2020/0017399 A1* | 1/2020 | Click | .................. C03C 10/0027 |
| 2020/0156994 A1 | 5/2020 | Li et al. | |
| 2020/0263317 A1 | 8/2020 | Mori et al. | |
| 2022/0267205 A1* | 8/2022 | Chien | ..................... C03C 3/097 |

FOREIGN PATENT DOCUMENTS

| | | |
|---|---|---|
| CN | 101714504 A | 5/2010 |
| CN | 101962295 A | 2/2011 |
| CN | 102384654 A | 3/2012 |
| CN | 103003212 A | 3/2013 |
| CN | 105731808 A | 7/2016 |
| CN | 105753314 A | 7/2016 |
| CN | 105884184 A | 8/2016 |
| CN | 105899469 A | 8/2016 |
| CN | 106660861 A | 5/2017 |
| CN | 107001120 A | 8/2017 |
| CN | 107265845 A | 10/2017 |
| CN | 206580739 U | 10/2017 |
| CN | 206683413 U | 11/2017 |
| CN | 107619193 A | 1/2018 |
| CN | 107902909 A | 4/2018 |
| CN | 109071316 A | 12/2018 |
| CN | 111954646 A | 11/2020 |
| DE | 102016111438 A1 | 12/2017 |
| DE | 202018102534 U1 | 5/2018 |
| EP | 0508131 A2 | 10/1992 |
| EP | 2323955 A1 | 5/2011 |
| EP | 3293157 A1 | 3/2018 |
| JP | 62-070239 A | 3/1987 |
| JP | 02-116639 A | 5/1990 |
| JP | 05-043263 A | 2/1993 |
| JP | 05032334 B2 | 5/1993 |
| JP | 2000-072489 A | 3/2000 |
| JP | 2001-097740 A | 4/2001 |
| JP | 2002-087835 A | 3/2002 |
| JP | 2006-232661 A | 9/2006 |
| JP | 2008-303073 A | 12/2008 |
| JP | 2014012617 A | 1/2014 |
| JP | 2015069669 A | 4/2015 |
| JP | 2016-108218 A | 6/2016 |
| JP | 2017-530933 A | 10/2017 |
| TW | 201623179 A | 7/2016 |
| TW | 201731783 A | 9/2017 |
| WO | 2010/002477 A1 | 1/2010 |
| WO | 2012/121116 A1 | 9/2012 |
| WO | 2016/057748 A1 | 4/2016 |
| WO | 2016/154235 A1 | 9/2016 |
| WO | 2017/104513 A1 | 6/2017 |
| WO | 2019/022033 A1 | 1/2019 |
| WO | 2019/191358 A1 | 10/2019 |

OTHER PUBLICATIONS

Karamanov degree of crystallization by density measurement (Year: 1999).*

Reddy et al; "Fracture Toughness Measurement of Glass and Ceramic Materials Using Chevron-Notched Specimens," J. Am. Ceram. Soc., 71 [6], C-310-C-313 (1988).

Bubsey et al; "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992).

Tang et al; "Automated Apparatus for Measuring the Frangibility and Fragmentation of Strengthened Glass"; Experimental Mechanics (2014) 54: 903-912.

Beall et al; "High Strength Glass-Ceramics Having Petalite and Lithium Silicate Structures"; Filed as U.S. Appl. No. 62/205,120, filed Aug. 14, 2015; 69 Pages.

Eppler, "Glass formation and recrystallization in the lithium metasilicate region of the system $Li_2O$—$Al_2O_3$—$SiO_2$," Journal of the American Ceramic Society 46(2) 1963, pp. 97-101.

International Search Report and Written Opinion of the European International Searching Authority; PCT/US2019/041773; dated Oct. 11, 2019; 10 Pgs.

* cited by examiner

METHODS FOR CERAMMING GLASS WITH NUCLEATION AND GROWTH DENSITY AND VISCOSITY CHANGES

CROSS-REFERENCE TO RELATED APPLICATIONS

This application claims the benefit of priority under 35 U.S.C. § 119 of U.S. Provisional Application Ser. No. 62/769,253 filed on Nov. 19, 2018 and U.S. Provisional Application Ser. No. 62/698,623 filed on Jul. 16, 2018, the content of each is relied upon and incorporated herein by reference in their entirety.

BACKGROUND

Field

The present specification generally relates to processes for ceramming glass articles to form glass-ceramics articles and particularly relates to processes for ceramming glass articles to form glass-ceramic articles by modifying the ceramming cycle based on changes of the nucleation and growth density and viscosity of the article during the ceramming cycle.

Technical Background

There continues to be a demand for high strength glass that can be used in portable electronic devices. Several materials are currently being used as covers for portable electronic devices, such as glass, zirconia, plastics, metals, and glass-ceramics. Benefits of using glass-ceramics include high strength and high transmissivity, which make glass-ceramics a good choice for optical displays and for electromagnetic charging.

However, forming glass-ceramics can be difficult, particularly when trying to obtain high throughputs during the ceramming process. For example, forming glass-ceramics requires precise control of the thermal profile of glass articles during the ceramming process, which becomes difficult when glass articles are stacked in a heating apparatus, such as, for example, a lehr.

SUMMARY

According to a first aspect, a method for ceramming a glass article to a glass-ceramic comprises: placing a glass article into a heating apparatus; heating the glass article to a first hold temperature at a first predetermined heating rate; holding the glass article at the first hold temperature for a first predetermined duration, wherein viscosity of the glass article is maintained within log viscosity ±1.0 poise of a target viscosity during the first predetermined duration; heating the glass article from the first hold temperature to a second hold temperature at a second predetermined heating rate; holding the glass article at the second hold temperature for a second duration, wherein density of the glass article is monitored from the heating of the glass article from the first hold temperature through the second duration; and ending the second duration when an absolute value of a density rate of change of the glass article is less than or equal to 0.10 $(g/cm^3)/min$.

A second aspect includes the method of the first aspect wherein ending the second duration occurs when the absolute value of the density rate of change of the glass article is equal to 0.00 $(g/cm^3)/min$.

A third aspect includes the method of any one of the first and second aspects, wherein during first predetermined duration, the viscosity of the glass article is maintained within log of viscosity ±0.1 poise of the target viscosity.

A fourth aspect includes the method of any one of the first to third aspects, wherein a viscosity of the glass article is maintained within log of viscosity ±1.0 poise of the target viscosity during at least a portion of the heating the glass article from the first hold temperature to a second hold temperature.

A fifth aspect includes the method of any one of the first to fourth aspects, wherein the viscosity of the glass article is maintained within log viscosity ±1.0 poise of the target viscosity during the first predetermined duration using data from an automatic viscosity control system.

A sixth aspect includes the method of any one of the first to fifth aspects, wherein the density of the glass article is monitored in-situ during the heating the glass article from the first hold temperature to a second hold temperature and the holding the glass article at the second hold temperature for a second duration.

A seventh aspect includes the method of the sixth aspect, wherein the density of the glass article is monitored in-situ of the heating the glass article from the first hold temperature to a second hold temperature at a second predetermined heating rate and the holding the glass article at the second hold temperature for a second duration with a dilatometer.

An eighth aspect includes the method of any one of the first to seventh aspects, wherein the second duration is ended when the density of the glass article is constant for at least 15 minutes, or preferably at least 50 minutes.

A ninth aspect includes the method of any one of the first to eighth aspects, wherein the second duration is ended when the density of the glass article is constant for at least 100 minutes.

A tenth aspect includes the method of any one of the first to ninth aspects, wherein the first predetermined heating rate is determined based at least in part on performance of an automatic viscosity control system.

An eleventh aspect includes the method of any one of the first to tenth, wherein the second predetermined heating rate is determined based at least in part on performance of an automatic viscosity control system.

A twelfth aspect includes the method of any one of the first to eleventh, further comprising applying a weight constraining force to the glass article.

A thirteenth aspect includes the method of any one of the first to twelfth aspects, wherein the glass article is part of a glass stack.

A fourteenth aspect includes the method of the thirteenth aspect, wherein the glass stack comprises: a first setter; a plurality of glass sheets placed on the first setter; and a second setter on the stack of glass sheets.

A fifteenth aspect includes the method of the fourteenth aspect, wherein the plurality of glass sheets comprises at least 10 glass sheets.

A sixteenth aspect includes the method of the fourteenth aspect, wherein the plurality of glass sheets comprises at least 20 glass sheets.

A seventeenth aspect includes the method of any one of the first to eighteenth aspects, wherein a temperature differential of the glass article from a programmed temperature within the first predetermined duration is within ±8° C.

An eighteenth aspect includes the method of any one of the first to seventeenth aspects, wherein a temperature differential of the glass article from a programmed temperature within the first predetermined duration is within ±5° C.

A nineteenth aspect includes the method of any one of the first to eighteenth aspects, wherein a temperature differential of the glass article from a programmed temperature within the second duration is within ±8° C.

A twentieth aspect includes the method of any one of the first to nineteenth aspects, wherein a temperature differential of the glass article from a programmed temperature within the second duration is within ±5° C.

A twenty-first aspect includes the method of any one of the first to twentieth aspects, wherein heating the glass article to a first hold temperature at a first predetermined heating rate comprises multistage heating.

A twenty-second aspect includes the method of any one of the first to twenty-first aspects, wherein during the heating the glass article to a first hold temperature at a first predetermined heating rate, the viscosity of the glass article is maintained at greater than or equal to log viscosity 11.0 poise.

A twenty-third aspect includes the method of any one of the first to twenty-second aspects, wherein during the first predetermined duration, the viscosity of the glass article is maintained at greater than or equal to log viscosity 11.0 poise.

A twenty-fourth aspect includes the method of any one of the first to twenty-third aspects, wherein during the heating the glass article to a first hold temperature at a first predetermined heating rate, the viscosity of the glass article is maintained at greater than or equal to log viscosity 11.0 poise.

A twenty-fifth aspect includes the method of any one of the first to twenty-fourth aspects, wherein the viscosity of the glass article is maintained at greater than or equal to log viscosity 11.0 poise for the entire duration of the method.

A twenty-sixth aspect includes the method of any one of the first to twenty-first aspects, wherein the viscosity of the glass article is maintained at greater than or equal to log viscosity 11.0 poise for the entire duration of the method.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
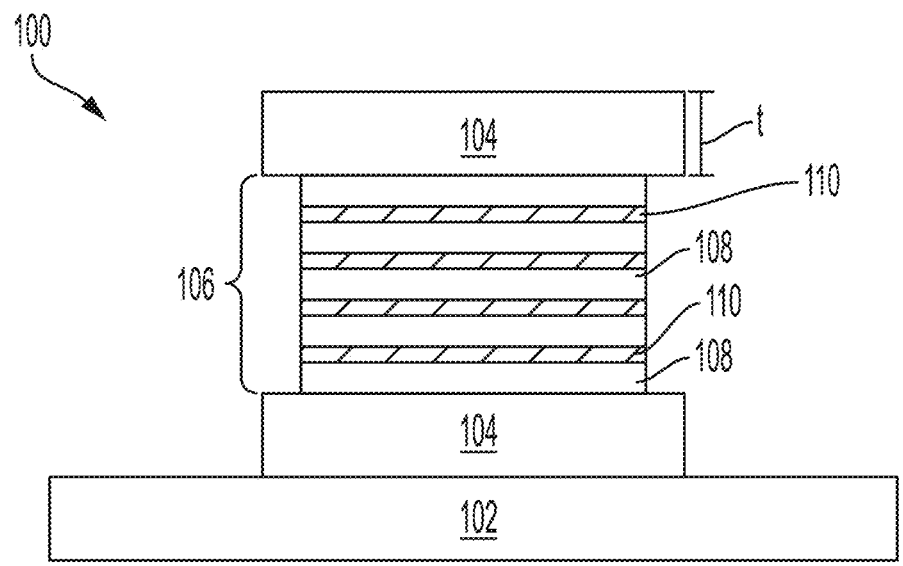
FIG. 1 schematically depicts a glass stack according to embodiments disclosed and described herein.

Reference will now be made in detail to embodiments of methods for ceramming glass articles, embodiments of which are illustrated in the accompanying drawings. Whenever possible, the same reference numerals will be used throughout the drawings to refer to the same or like parts. In one embodiment, a method for ceramming a glass article to a glass-ceramic comprises: placing a glass article into a heating apparatus; heating the glass article to a first hold temperature at a first predetermined heating rate; holding the glass article at the first hold temperature for a first predetermined duration, wherein viscosity of the glass article is maintained within log viscosity ±1.0 poise of a target viscosity during the first predetermined duration; heating the glass article from the first hold temperature to a second hold temperature at a second predetermined heating rate; holding the glass article at the second hold temperature for a second duration, wherein density of the glass article is monitored from the heating of the glass article from the first hold temperature through the second duration; and ending the second duration when the density of the glass article is constant. Various embodiments for ceramming glass articles will be described herein with specific reference to the appended drawings.

In general, a process for forming a glass-ceramic includes forming a glass article and ceramming the glass article to transform the glass article into a glass-ceramic form. Referring to FIG. 1, an example stack configuration 100 for ceramming is illustrated. The stack configuration 100 includes a carrier plate 102 supporting two setter plates 104, and a glass stack 106 positioned between the setter plates 104.

In some embodiments, insulation layers (not shown) may be located on the top surface of the upper setter plate 104 and on the bottom surface of the lower setter plate 104. The insulation layers may be formed from any material having a low thermal conductivity, and can reduce or even eliminate axial temperature gradients of the glass sheets 108 on the top and bottom of the glass stack 106.

As shown in FIG. 1, the glass stack 106 includes a plurality of glass sheets 108, each glass sheet 108 being separated from an adjacent glass sheet 108 by a parting agent layer 110. The parting agent layer 110 reduces or even eliminates the sticking of the glass sheets 108 in the glass stack 106 during the ceramming process. Although not depicted in FIG. 1, in some embodiments, the glass stack 106 may further include a parting agent layer 110 between the glass sheet 108 and the setter plate 104. In other embodiments, such as in various embodiments described below, the setter plate 104 is made from a material that does not react with the glass sheet 108, and a parting agent layer 110 is not required to prevent interactions between the glass sheet 108 and the setter plate 104.

Generally, to form the glass-ceramic, the glass stack 106 is heated at a temperature above its annealing point for a time sufficient to develop crystal nuclei (also referred to as "nucleation"). The heat treatment can be performed, for example, in a lehr or furnace. After being heated above its annealing point, the glass is then further heated, usually at a higher temperature between the glass annealing point and the glass softening point, to develop the crystal phase (also referred to as "growth" or "crystallization"). In various embodiments, the heat treatment, or ceramming process, includes heating the glass stack to a nucleation temperature, maintaining the nucleation temperature for a predetermined period of time, heating the glass stack to a crystallization temperature, and maintaining the crystallization temperature for a predetermined period of time.

The glass sheets 108 may be made from any glass composition that is suitable for forming glass-ceramic articles, although it should be understood that the glass composition of the glass sheets 108 can impact the mechanical and optical properties of the glass-ceramic article. In various embodiments, the glass composition is selected such that the resultant glass-ceramic article has a petalite crystalline phase and a lithium silicate crystalline phase and wherein the petalite crystalline phase and the lithium silicate crystalline phase have higher weight percentages than other crystalline phases present in the glass-ceramic article.

By way of example and not limitation, in various embodiments, the glass sheets 108 may be formed from a glass composition including from about 55 wt % to about 80 wt % $SiO_2$, from about 2 wt % to about 20 wt % $Al_2O_3$, from about 5 wt % to about 20 wt % $Li_2O$, from about 0 wt % to about 10 wt % $B_2O_3$, from about 0 wt % to about 5 wt % $Na_2O$, from about 0 wt % to about 10 wt % ZnO, from about 0.5 wt % to about 6 wt % $P_2O_5$, and from about 0.2 wt % to about 15 wt % $ZrO_2$.

$SiO_2$, an oxide involved in the formation of glass, can function to stabilize the networking structure of glasses and glass-ceramics. In various glass compositions, the concentration of $SiO_2$ should be sufficiently high in order to form petalite crystal phase when the glass sheet is heat treated to convert to a glass-ceramic. The amount of $SiO_2$ may be limited to control the melting temperature of the glass, as the melting temperature of pure $SiO_2$ or high-$SiO_2$ glasses is undesirably high. In some embodiments, the glass or glass-ceramic composition comprises from about 55 wt % to about 80 wt % $SiO_2$. In some embodiments, the glass or glass-ceramic composition comprises from about 69 wt % to about 80 wt % $SiO_2$. In some embodiments, the glass or glass-ceramic composition can comprise from about 55 wt % to about 80 wt %, about 55 wt % to about 77 wt %, about 55 wt % to about 75 wt %, about 55 wt % to about 73 wt %, about 60 wt % to about 80 wt %, about 60 wt % to about 77 wt %, about 60 wt % to about 75 wt %, about 60 wt % to about 73 wt %, about 69 wt % to about 80 wt %, about 69 wt % to about 77 wt %, about 69 wt % to about 75 wt %, about 69 wt % to about 73 wt %, about 70 wt % to about 80 wt %, about 70 wt % to about 77 wt %, about 70 wt % to about 75 wt %, about 70 wt % to about 73 wt %, about 73 wt % to about 80 wt %, about 73 wt % to about 77 wt %, about 73 wt % to about 75 wt %, about 75 wt % to about 80 wt %, about 75 wt % to about 77 wt %, or about 77 wt % to about 80 wt % $SiO_2$, and any and all sub-ranges formed from any of the foregoing endpoints.

$Al_2O_3$ may also provide stabilization to the network and also provides improved mechanical properties and chemical durability. If the amount of $Al_2O_3$ is too high, however, the fraction of lithium silicate crystals may be decreased, possibly to the extent that an interlocking structure cannot be formed. The amount of $Al_2O_3$ can be tailored to control viscosity. Further, if the amount of $Al_2O_3$ is too high, the viscosity of the melt is also generally increased. In some embodiments, the glass or glass-ceramic composition can comprise from about 2 wt % to about 20 wt % $Al_2O_3$. In some embodiments, the glass or glass-ceramic composition can comprise from about 6 wt % to about 9 wt % $Al_2O_3$. In some embodiments, the glass or glass-ceramic composition can comprise from about 2 wt % to about 20 wt %, about 2 wt % to about 18 wt %, about 2 wt % to about 15 wt %, about 2 wt % to about 12 wt %, about 2 wt % to about 10 wt %, about 2 wt % to about 9 wt %, about 2 wt % to about 8 wt %, about 2 wt % to about 5 wt %, about 5 wt % to about 20 wt %, about 5 wt % to about 18 wt %, about 5 wt % to about 15 wt %, about 5 wt % to about 12 wt %, about 5 wt % to about 10 wt %, about 5 wt % to about 9 wt %, about 5 wt % to about 8 wt %, 6 wt % to about 20 wt %, about 6 wt % to about 18 wt %, about 6 wt % to about 15 wt %, about 6 wt % to about 12 wt %, about 6 wt % to about 10 wt %, about 6 wt % to about 9 wt %, 8 wt % to about 20 wt %, about 8 wt % to about 18 wt %, about 8 wt % to about 15 wt %, about 8 wt % to about 12 wt %, about 8 wt % to about 10 wt %, 10 wt % to about 20 wt %, about 10 wt % to about 18 wt %, about 10 wt % to about 15 wt %, about 10 wt % to about 12 wt %, about 12 wt % to about 20 wt %, about 12 wt % to about 18 wt %, or about 12 wt % to about 15 wt % $Al_2O_3$, and any and all sub-ranges formed from any of the foregoing endpoints.

In the glass and glass-ceramics herein, $Li_2O$ aids in forming both petalite and lithium silicate crystal phases. In fact, to obtain petalite and lithium silicate as the predominant crystal phases, it is desirable to have at least about 7 wt % $Li_2O$ in the composition. Additionally, it has been found that once $Li_2O$ gets too high (greater than about 15 wt %), the composition becomes very fluid. Accordingly, in some embodiments, the glass or glass-ceramic composition can comprise from about 5 wt % to about 20 wt % $Li_2O$. In other embodiments, the glass or glass-ceramic composition can comprise from about 10 wt % to about 14 wt % $Li_2O$. In some embodiments, the glass or glass-ceramic composition can comprise from about 5 wt % to about 20 wt %, about 5 wt % to about 18 wt %, about 5 wt % to about 16 wt %, about 5 wt % to about 14 wt %, about 5 wt % to about 12 wt %, about 5 wt % to about 10 wt %, about 5 wt % to about 8 wt %, about 7 wt % to about 20 wt %, about 7 wt % to about 18 wt %, about 7 wt % to about 16 wt %, about 7 wt % to about 14 wt %, about 7 wt % to about 12 wt %, about 7 wt % to about 10 wt %, about 10 wt % to about 20 wt %, about 10 wt % to about 18 wt %, about 10 wt % to about 16 wt %, about 10 wt % to about 14 wt %, about 10 wt % to about 12 wt %, about 12 wt % to about 20 wt %, about 12 wt % to about 18 wt %, about 12 wt % to about 16 wt %, about 12 wt % to about 14 wt %, about 14 wt % to about 20 wt %, about 14 wt % to about 18 wt %, about 14 wt % to about 16 wt %, about 16 wt % to about 20 wt %, about 16 wt % to about 18 wt %, or about 18 wt % to about 20 wt % $Li_2O$, and any and all sub-ranges formed from any of the foregoing endpoints.

As noted above, $Li_2O$ is generally useful for forming various glass-ceramics, but the other alkali oxides tend to decrease glass-ceramic formation and form an aluminosilicate residual glass in the glass-ceramic. It has been found that more than about 5 wt % $Na_2O$ or $K_2O$, or combinations thereof, leads to an undesirable amount of residual glass, which can lead to deformation during crystallization and undesirable microstructures from a mechanical property perspective. The composition of the residual glass may be tailored to control viscosity during crystallization, minimizing deformation or undesirable thermal expansion, or control microstructure properties. Therefore, in general, the glass sheets may be made from glass compositions having low amounts of non-lithium alkali oxides. In some embodiments, the glass or glass-ceramic composition can comprise from about 0 wt % to about 5 wt % $R_2O$, wherein R is one or more of the alkali cations Na and K. In some embodiments, the glass or glass-ceramic composition can comprise from about 1 wt % to about 3 wt % $R_2O$, wherein R is one or more of the alkali cations Na and K. In some embodiments, the glass or glass-ceramic composition can comprise from 0 wt % to about 5 wt %, 0 wt % to about 4 wt %, 0 wt % to about 3 wt %, 0 wt % to about 2 wt %, 0 wt % to about 1 wt %, >0 wt % to about 5 wt %, >0 wt % to about 4 wt %, >0 wt % to about 3 wt %, >0 wt % to about 2 wt %, >0 wt % to about 1 wt %, about 1 wt % to about 5 wt %, about 1 wt % to about 4 wt %, about 1 wt % to about 3 wt %, about 1 wt % to about 2 wt %, about 2 wt % to about 5 wt %, about 2 wt % to about 4 wt %, about 2 wt % to about 3 wt %, about 3 wt % to about 5 wt %, about 3 wt % to about 4 wt %, or about 4 wt % to about 5 wt % $Na_2O$, $K_2O$, or combinations thereof, and any and all sub-ranges formed from any of the foregoing endpoints.

The glass and glass-ceramic compositions can include $P_2O_5$. $P_2O_5$ can function as a nucleating agent to produce bulk nucleation. If the concentration of $P_2O_5$ is too low, the precursor glass does crystallize, but only at higher temperatures (due to a lower viscosity) and from the surface inward, yielding a weak and often deformed body. However, if the concentration of $P_2O_5$ is too high, the devitrification, upon cooling during the formation of the glass sheets, can be difficult to control. Embodiments can include from >0 wt % to about 6 wt % $P_2O_5$. Other embodiments can include from about 2 wt % to about 4 wt % $P_2O_5$. Still other embodiments can include from about 1.5 wt % to about 2.5 wt % $P_2O_5$. In some embodiments, the glass or glass-ceramic composition can include from 0 wt % to about 6 wt %, 0 wt % to about 5.5 wt %, 0 wt % to 5 wt %, 0 wt % to about 4.5 wt %, 0 wt % to about 4 wt %, 0 wt % to about 3.5 wt %, 0 wt % to about 3 wt %, 0 wt % to about 2.5 wt %, 0 wt % to about 2 wt %, 0 wt % to about 1.5 wt %, 0 wt % to about 1 wt %, >0 wt % to about 6 wt %, >0 wt % to about 5.5 wt %, >0 wt % to 5 wt %, >0 wt % to about 4.5 wt %, >0 wt % to about 4 wt %, >0 wt % to about 3.5 wt %, >0 wt % to about 3 wt %, >0 wt % to about >2.5 wt %, 0 wt % to about 2 wt %, >0 wt % to about 1.5 wt %, >0 wt % to about 1 wt %, 0.5 wt % to about 6 wt %, about 0.5 wt % to about 5.5 wt %, about 0.5 wt % to 5 wt %, about 0.5 wt % to about 4.5 wt %, about 0.5 wt % to about 4 wt %, about 0.5 wt % to about 3.5 wt %, about 0.5 wt % to about 3 wt %, about 0.5 wt % to about 2.5 wt %, about 0.5 wt % to about 2 wt %, about 0.5 wt % to about 1.5 wt %, about 0.5 wt % to about 1 wt %, about 1 wt % to about 6 wt %, about 1 wt % to about 5.5 wt %, about 1 wt % to 5 wt %, about 1 wt % to about 4.5 wt %, about 1 wt % to about 4 wt %, about 1 wt % to about 3.5 wt %, about 1 wt % to about 3 wt %, about 1 wt % to about 2.5 wt %, about 1 wt % to about 2 wt %, about 1 wt % to about 1.5 wt %, about 1.5 wt % to about 6 wt %, about 1.5 wt % to about 5.5 wt %, about 1.5 wt % to 5 wt %, about 1.5 wt % to about 4.5 wt %, about 1.5 wt % to about 4 wt %, about 1.5 wt % to about 3.5 wt %, about 1.5 wt % to about 3 wt %, about 1.5 wt % to about 2.5 wt %, about 1.5 wt % to about 2 wt %, about 2 wt % to about 6 wt %, about 2 wt % to about 5.5 wt %, about 2 wt % to 5 wt %, about 2 wt % to about 4.5 wt %, about 2 wt % to about 4 wt %, about 2 wt % to about 3.5 wt %, about 2 wt % to about 3 wt %, about 2 wt % to about 2.5 wt %, about 2.5 wt % to about 6 wt %, about 2.5 wt % to about 5.5 wt %, about 2.5 wt % to 5 wt %, about 2.5 wt % to about 4.5 wt %, about 2.5 wt % to about 4 wt %, about 2.5 wt % to about 3.5 wt %, about 2.5 wt % to about 3 wt %, about 3 wt % to about 6 wt %, about 3 wt % to about 5.5 wt %, about 3 wt % to 5 wt %, about 3 wt % to about 4.5 wt %, about 3 wt % to about 4 wt %, about 3 wt % to about 3.5 wt %, about 3.5 wt % to about 6 wt %, about 3.5 wt % to about 5.5 wt %, about 3.5 wt % to 5 wt %, about 3.5 wt % to about 4.5 wt %, about 3.5 wt % to about 4 wt %, about 4 wt % to about 6 wt %, about 4 wt % to about 5.5 wt %, about 4 wt % to 5 wt %, about 4 wt % to about 4.5 wt %, about 4.5 wt % to about 6 wt %, about 4.5 wt % to about 5.5 wt %, about 4.5 wt % to about 5 wt %, about 5 wt % to about 6 wt %, about 5 wt % to about 5.5 wt %, or about 5.5 wt % to about 6 wt % $P_2O_5$, and any and all sub-ranges formed from any of the foregoing endpoints.

In various glass and glass-ceramic compositions, it is generally found that $ZrO_2$ can improve the stability of $Li_2O$—$Al_2O_3$—$SiO_2$—$P_2O_5$ glass by significantly reducing glass devitrification during forming and lowering liquidus temperature. At concentrations above 8 wt %, $ZrSiO_4$ can form a primary liquidus phase at a high temperature, which significantly lowers liquidus viscosity. Transparent glasses can be formed when the glass contains over 2 wt % $ZrO_2$. The addition of $ZrO_2$ can also help decrease the petalite grain size, which aids in the formation of a transparent glass-ceramic. In some embodiments, the glass or glass-ceramic composition can comprise from about 0.2 wt % to about 15 wt % $ZrO_2$. In some embodiments, the glass or glass-ceramic composition can include from about 2 wt % to about 4 wt % $ZrO_2$. In some embodiments, the glass or glass-ceramic composition can comprise from about 0.2 wt % to about 15 wt %, about 0.2 wt % to about 12 wt %, about 0.2 wt % to about 10 wt %, about 0.2 wt % to about 8 wt %, about 0.2 wt % to about 6 wt %, about 0.2 wt % to about 4 wt %, about 0.5 wt % to about 15 wt %, about 0.5 wt % to about 12 wt %, about 0.5 wt % to about 10 wt %, about 0.5 wt % to about 8 wt %, about 0.5 wt % to about 6 wt %, about 0.5 wt % to about 4 wt %, about 1 wt % to about 15 wt %, about 1 wt % to about 12 wt %, about 1 wt % to about 10 wt %, about 1 wt % to about 8 wt %, about 1 wt % to about 6 wt %, about 1 wt % to about 4 wt %, about 2 wt % to about 15 wt %, about 2 wt % to about 12 wt %, about 2 wt % to about 10 wt %, about 2 wt % to about 8 wt %, about 2 wt % to about 6 wt %, about 2 wt % to about 4 wt %, about 3 wt % to about 15 wt %, about 3 wt % to about 12 wt %, about 3 wt % to about 10 wt %, about 3 wt % to about 8 wt %, about 3 wt % to about 6 wt %, about 3 wt % to about 4 wt %, about 4 wt % to about 15 wt %, about 4 wt % to about 12 wt %, about 4 wt % to about 10 wt %, about 4 wt % to about 8 wt %, about 4 wt % to about 6 wt %, about 8 wt % to about 15 wt %, about 8 wt % to about 12 wt %, about 8 wt % to about 10 wt %, about 10 wt % to about 15 wt %, about 10 wt % to about 12 wt %, or about 12 wt % to about 15 wt % $ZrO_2$, and any and all sub-ranges formed from any of the foregoing endpoints.

$B_2O_3$ is conducive to providing a glass sheet with a low melting temperature. Furthermore, the addition of $B_2O_3$ in the glass sheet and thus the glass-ceramic article helps achieve an interlocking crystal microstructure and can also improve the damage resistance of the glass-ceramic article. When boron in the residual glass is not charge balanced by alkali oxides or divalent cation oxides, it will be in trigonal-coordination state (or three-coordinated boron), which opens up the structure of the glass. The network around these three coordinated boron is not as rigid as tetrahedrally coordinated (or four-coordinated) boron. Without being bound by theory, it is believed that glass sheets and glass-ceramics that include three-coordinated boron can tolerate some degree of deformation before crack formation. By tolerating some deformation, the Vickers indentation crack initiation values are increased. Fracture toughness of the glass sheets and glass-ceramics that include three-coordinated boron may also be increased. Without being bound by theory, it is believed that the presence of boron in the residual glass of the glass-ceramic (and glass sheet) lowers the viscosity of the residual glass (or glass sheet), which facilitates the growth of lithium silicate crystals, especially large crystals having a high aspect ratio. A greater amount of three-coordinated boron (in relation to four-coordinated boron) is believed to result in glass-ceramics that exhibit a greater Vickers indentation crack imitation load. In some embodiments, the amount of three-coordinated boron (as a percent of total $B_2O_3$) may be about 40% or greater, 50% or greater, 75% or greater, 85% or greater, or even 95% or greater. The amount of boron in general should be controlled to maintain chemical durability and mechanical strength of the cerammed bulk glass-ceramic.

In one or more embodiments, the glass or glass-ceramic composition comprises from 0 wt % to about 10 wt % or from 0 wt % to about 2 wt % $B_2O_3$. In some embodiments, the glass or glass-ceramic composition can comprise from 0 wt % to about 10 wt %, 0 wt % to about 9 wt %, 0 wt % to about 8 wt %, 0 wt % to about 7 wt %, 0 wt % to about 6 wt %, 0 wt % to about 5 wt %, 0 wt % to about 4 wt %, 0 wt % to about 3 wt %, 0 wt % to about 2 wt %, 0 wt % to about 1 wt %, >0 wt % to about 10 wt %, >0 wt % to about 9 wt %, >0 wt % to about 8 wt %, >0 wt % to about 7 wt %, >0 wt % to about 6 wt %, >0 wt % to about 5 wt %, >0 wt % to about 4 wt %, >0 wt % to about 3 wt %, >0 wt % to about 2 wt %, >0 wt % to about 1 wt %, about 1 wt % to about 10 wt %, about 1 wt % to about 8 wt %, about 1 wt % to about 6 wt %, about 1 wt % to about 5 wt %, about 1 wt % to about 4 wt %, about 1 wt % to about 2 wt %, about 2 wt % to about 10 wt %, about 2 wt % to about 8 wt %, about 2 wt % to about 6 wt %, about 2 wt % to about 4 wt %, about 3 wt % to about 10 wt %, about 3 wt % to about 8 wt %, about 3 wt % to about 6 wt %, about 3 wt % to about 4 wt %, about 4 wt % to about 5 wt %, about 5 wt % to about 8 wt %, about 5 wt % to about 7.5 wt %, about 5 wt % to about 6 wt %, or about 5 wt % to about 5.5 wt % $B_2O_3$, and any and all sub-ranges formed from any of the foregoing endpoints.

MgO can enter petalite crystals in a partial solid solution. In one or more embodiments, the glass or glass-ceramic composition can comprise from 0 wt % to about 8 wt % MgO. In some embodiments, the glass or glass-ceramic composition can comprise from 0 wt % to about 8 wt %, 0 wt % to about 7 wt %, 0 wt % to about 6 wt %, 0 wt % to about 5 wt %, 0 wt % to about 4 wt %, 0 wt % to about 3 wt %, 0 wt % to about 2 wt %, 0 wt % to about 1 wt %, about 1 wt % to about 8 wt %, about 1 wt % to about 7 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 8 wt %, about 2 wt % to about 7 wt %, about 2 wt % to about 6 wt %, about 2 wt % to about 5 wt %, about 2 wt % to about 4 wt %, about 2 wt % to about 3 wt %, about 3 wt % to about 8 wt %, about 3 wt % to about 7 wt %, about 3 wt % to about 6 wt %, about 3 wt % to about 5 wt %, about 3 wt % to about 4 wt %, about 4 wt % to about 8 wt %, about 4 wt % to about 7 wt %, about 4 wt % to about 6 wt %, about 4 wt % to about 5 wt %, about 5 wt % to about 8 wt %, about 5 wt % to about 7 wt %, about 5 wt % to about 6 wt %, about 6 wt % to about 8 wt %, about 6 wt % to about 7 wt %, or about 7 wt % to about 8 wt % MgO, and any and all sub-ranges formed from any of the foregoing endpoints.

ZnO can enter petalite crystals in a partial solid solution. In one or more embodiments, the glass or glass-ceramic composition can comprise from 0 wt % to about 10 wt % ZnO. In some embodiments, the glass or glass-ceramic composition can comprise from 0 wt % to about 10 wt %, 0 wt % to about 9 wt %, 0 wt % to about 8 wt %, 0 wt % to about 7 wt %, 0 wt % to about 6 wt %, 0 wt % to about 5 wt %, 0 wt % to about 4 wt %, 0 wt % to about 3 wt %, 0 wt % to about 2 wt %, 0 wt % to about 1 wt %, about 1 wt % to about 10 wt %, about 1 wt % to about 9 wt %, about 1 wt % to about 8 wt %, about 1 wt % to about 7 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 10 wt %, about 2 wt % to about 9 wt %, about 2 wt % to about 8 wt %, about 2 wt % to about 7 wt %, about 2 wt % to about 6 wt %, about 2 wt % to about 5 wt %, about 2 wt % to about 4 wt %, about 2 wt % to about 3 wt %, about 3 wt % to about 10 wt %, about 3 wt % to about 9 wt %, about 3 wt % to about 8 wt %, about 3 wt % to about 7 wt %, about 3 wt % to about 6 wt %, about 3 wt % to about 5 wt %, about 3 wt % to about 4 wt %, about 4 wt % to about 10 wt %, about 4 wt % to about 9 wt %, about 4 wt % to about 8 wt %, about 4 wt % to about 7 wt %, about 4 wt % to about 6 wt %, about 4 wt % to about 5 wt %, about 5 wt % to about 10 wt %, about 5 wt % to about 9 wt %, about 5 wt % to about 8 wt %, about 5 wt % to about 7 wt %, about 5 wt % to about 6 wt %, about 6 wt % to about 10 wt %, about 6 wt % to about 9 wt %, about 6 wt % to about 8 wt %, about 6 wt % to about 7 wt %, about 7 wt % to about 10 wt %, about 7 wt % to about 9 wt %, about 7 wt % to about 8 wt %, about 8 wt % to about 10 wt %, about 8 wt % to about 9 wt %, or about 9 wt % to about 10 wt % ZnO, and any and all sub-ranges formed from any of the foregoing endpoints.

In various embodiments, the glass or glass-ceramic composition may further include one or more constituents, such as, by way of example and not limitation, $TiO_2$, $CeO_2$, and $SnO_2$. Additionally or alternatively, antimicrobial components may be added to the glass or glass-ceramic composition. Antimicrobial components that may be added to the glass or glass-ceramic may include, but are not limited to, Ag, AgO, Cu, CuO, $Cu_2O$, and the like. In some embodiments, the glass or glass-ceramic composition may further include a chemical fining agent. Such fining agents include, but are not limited to, $SnO_2$, $As_2O_3$, $Sb_2O_3$, F, Cl, and Br. Additional details on glass and/or glass-ceramic compositions suitable for use in various embodiments may be found in, for example, U.S. Patent Application Publication No. 2016/0102010 entitled "High Strength Glass-Ceramics Having Petalite and Lithium Silicate Structures," filed Oct. 8, 2015, which is incorporated by reference herein in its entirety.

In various embodiments, the glass compositions can be manufactured into sheets via processes, including but not limited to, slot draw, float, rolling, and other sheet-forming processes known to those skilled in the art.

Figure 2A:
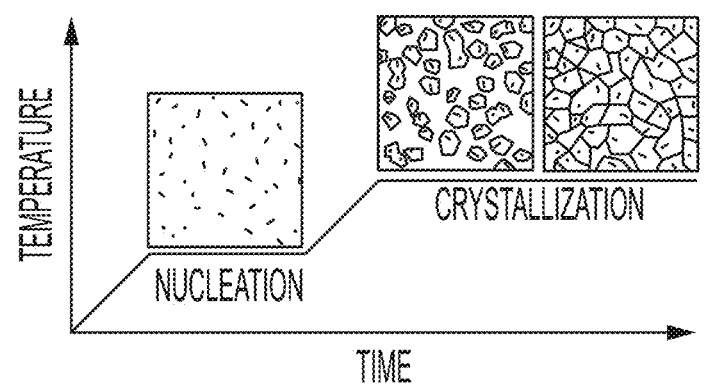
FIG. 2A graphically depicts temperature versus time measurements and nucleation and crystallization (growth) of a ceram cycle according to embodiments disclosed and described herein.
Figure 2B:
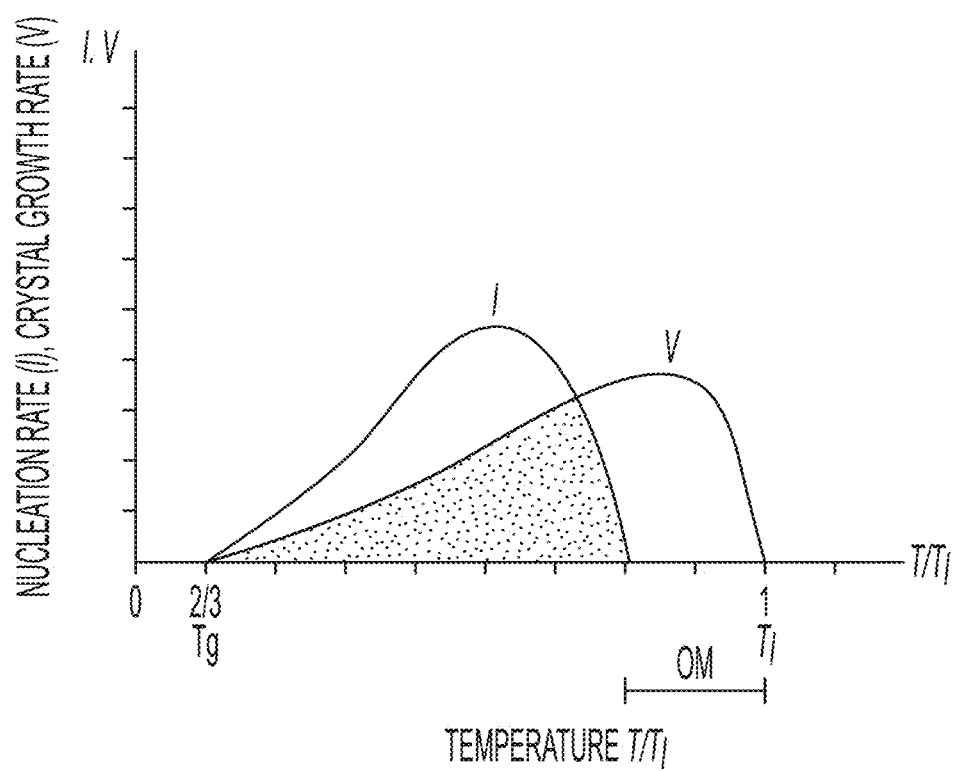
FIG. 2B graphically depicts the nucleation rate and crystal growth rate versus temperature in a ceram cycle according to embodiments disclosed and described herein.

Controlled bulk nucleation and growth are necessary to produce a desired glass-ceramic product. Bulk nucleation (both homogeneous and heterogeneous) is carried out at an elevated temperature for certain time as shown in FIG. 2A. Historically, the nucleation temperature and time are chosen empirically above the glass transition temperature (Tg) or anneal temperature as shown in FIG. 2B. Similarly, the growth temperature and time are also chosen empirically above the nucleation temperature. The optimized time and temperature can be achieved by changing both time and temperature for nucleation and growth stages of processing. The nucleation and crystal growth events are often overlapping. Therefore, physical properties such as viscosity evolve as a function of time in both nucleation and growth steps. However, the rate of the increase in density and/or viscosity changes when transitioning from the nucleation stage to the growth stage. When the rate of increase in the density and/or viscosity changes substantially, ceramming processes might not yield the desired final glass-ceramic product.

To avoid sagging, sticking, or viscous deformation, the time and temperature of the cycle should be controlled. Most conventional methods consist of trial and error based testing of intuitively designed thermal cycles, which are improved by materials characterization methods. Some examples of those characterization methods are the measurement of the heat flow of the crystallization peak as a function of annealing time with differential scanning calorimetry or in-situ analysis of X-ray diffraction peaks with time. Most of these methods do not assist the developers to find the optimum conditions for dimensional stability and they are very labor intensive and time-consuming. To overcome all those drawbacks, embodiments for creaming glass articles disclosed and described herein automatically determines ceramming cycles that will result in desired glass-ceramic articles. Embodiments of methods for ceramming comprise two analytical tools: (1) an automatic viscosity controller (AVC) to determine the cycle in the nucleation step and in the transitioning heating steps from nucleation to crystal growth; and (2) a non-contact in-situ density measurement method that determines the duration of the crystal growth. The entirety of the ceramming cycle is directly obtained using these two methods.

Figure 3:
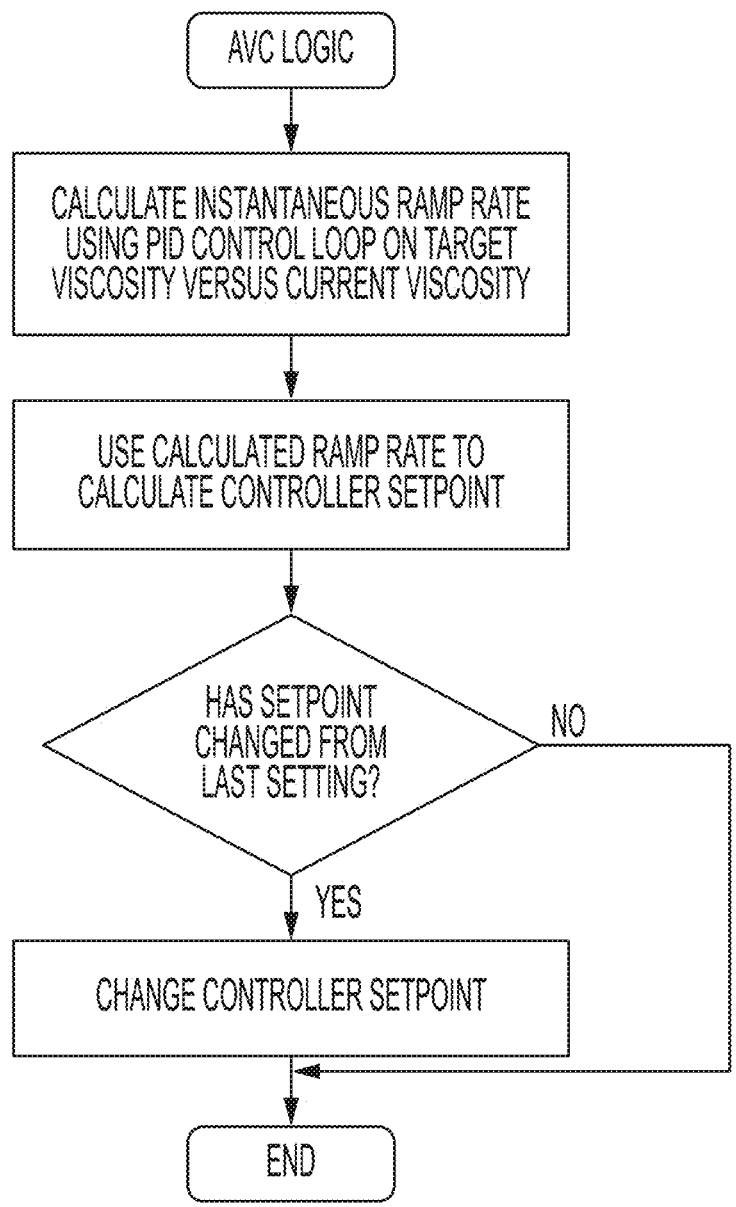
FIG. 3 is a flow chart of proportional-integral-derivative (PID) logic used in the automatic viscosity control (AVC) nucleation phase of a ceram cycle according to embodiments disclosed and described herein.

The objective of automatic viscosity control (AVC) is to hold the glass at a constant viscosity to define a time-temperature cycle with minimum sagging during a glass ceramming cycle. In this implementation, a constant viscosity is sustained by a) calculating the instantaneous viscosity using the deflection rate of a glass beam under constant stress in a 3-point beam bending set-up, and b) changing the heating/cooling rate dynamically using a proportional-integral-derivative (PID) control loop that defines the power output given to the furnace. When the viscosity of the glass article increases, the PID logic automatically increases the temperature, and when the viscosity of the glass article decreases, the PID logic decreases temperature. The PID control loop ensures a varying power output depending on the deviation from the target viscosity so that overshoots are avoided. FIG. 3 displays an embodiment of the implementation of AVC software logic. FIG. 3 is a PID flow chart that shows that an instantaneous ramp rate is first calculated using PID control loop on target viscosity versus the current, measured viscosity. Subsequently, the PID logic calculates a ramp rate to calculate the controller setpoint. Next, it is determined whether the previously calculated setpoint has changed from the last setpoint. If the calculated setpoint has changed, then the controller setpoint is changed and the PID logic is ended and reset. If the calculated set point has not changed, then the PID logic is ended and reset.

Figure 4:
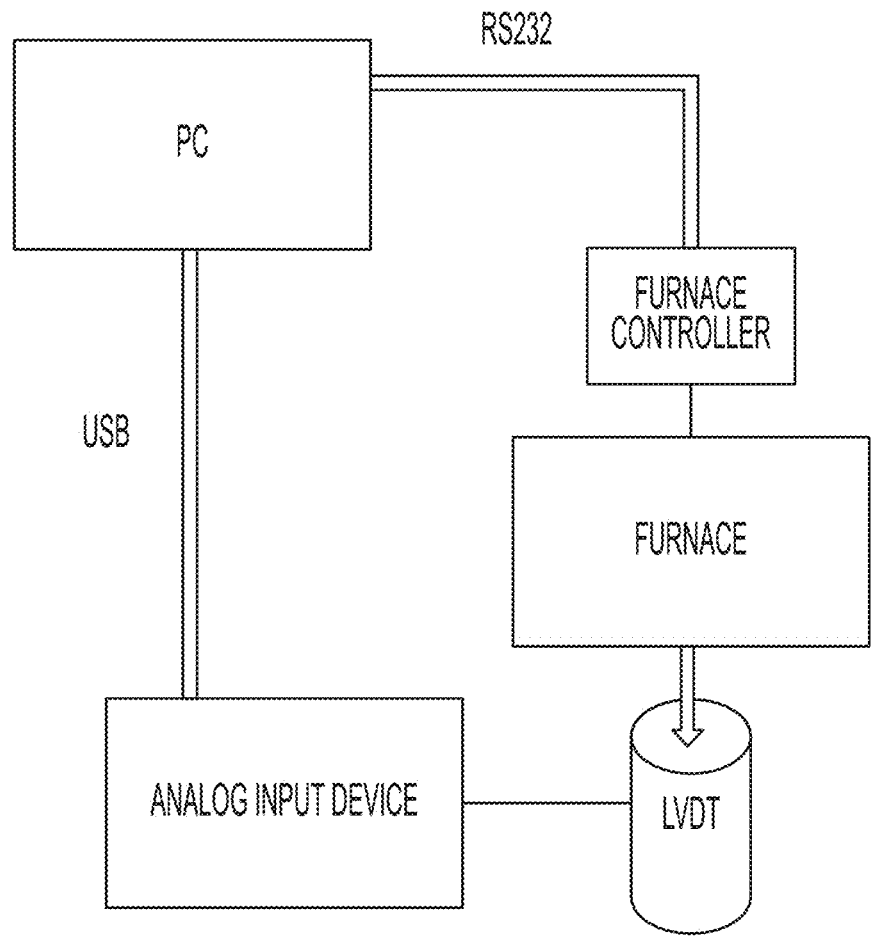
FIG. 4 is a block diagram that depicts a system used to operate AVC nucleation phase of a ceram cycle according to embodiments disclosed and described herein.

FIG. 4 shows the communication between the software logic, furnace and measurement set up according to embodiments. This method was applied to a 3-point bending viscometer based on the idea of constant stress, known geometry and varying furnace temperature. As shown in FIG. 4, a computer, such as a PC is connected to both the furnace controller and an analog input device. The furnace controller modifies parameters within the furnace, such as, for example temperature based on inputs it receives from the PC. The furnace is also connected to a linear variable differential controller (LVDT) that collects outputs from the furnace, such as outputs related to temperature, viscosity, etc. and transfers this data to the analog input device. As previously stated, the PC receives the data from the analog input device and calculates setpoints, such as temperature setpoints, to send to the furnace controller. Using such controls, the viscosity of the glass article can be kept relatively constant (such as within log viscosity±1.0 poise) during the nucleation stage.

Time-temperature cycle is obtained by defining a target constant viscosity where the glass article will be held. In this step—and according to embodiments—maximum temperature, maximum heating rate, target viscosity, sample geometry, sample dimensions, sample density, total applied load, span size of the three-point bending set-up are the only input in the software. Then following the software logic, as explained with reference to FIG. 3, the AVC automatically defines the time-temperature schedule until the beam deflection (glass viscosity) is out of the measurement range. The viscosity measurement range is typically good enough to capture the nucleation step and the transitioning (heating range change) from the nucleation to the crystal growth steps. However, the viscosity measurement does not accurately capture the crystal growth stage itself.

Figure 5:
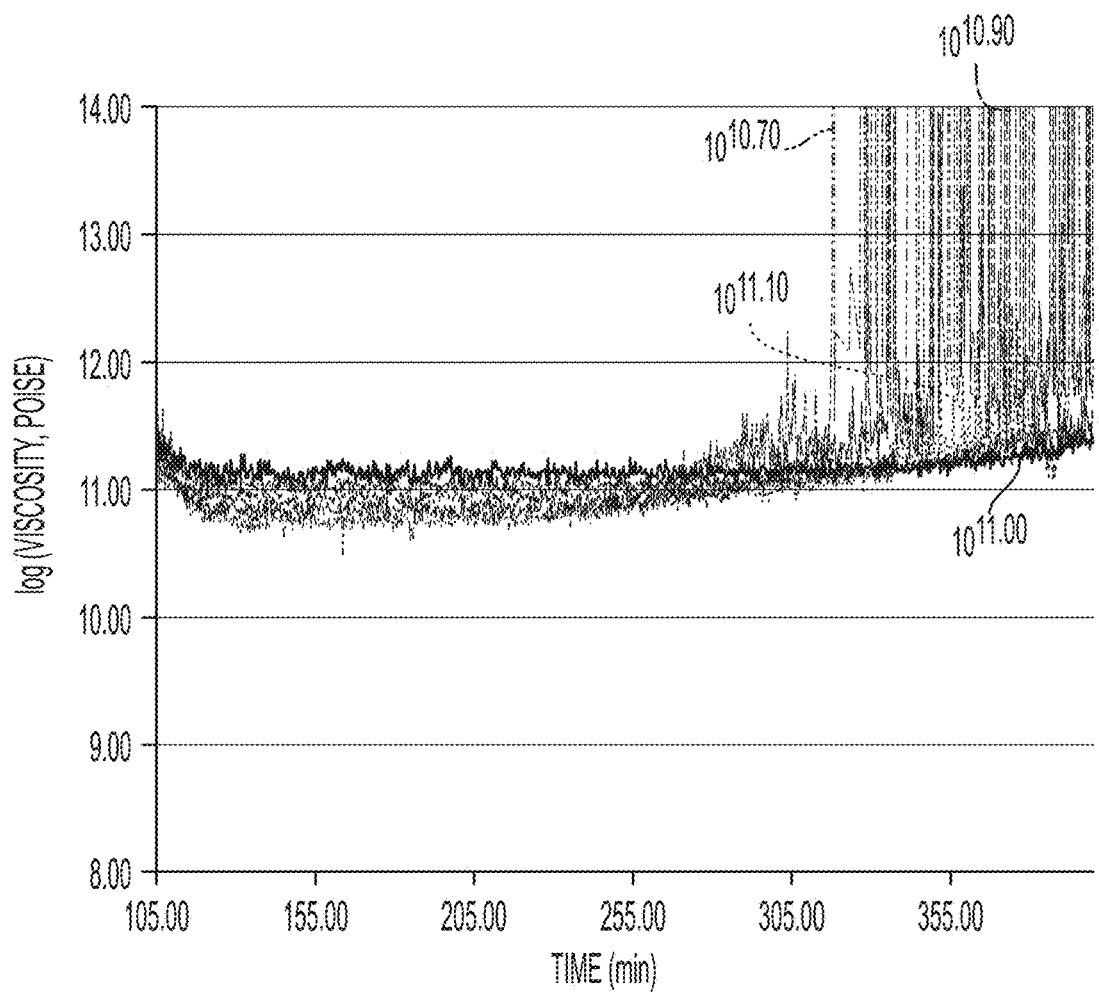
FIG. 5 graphically depicts log viscosity in poise versus time in minutes of a ceram cycle according to embodiments disclosed and described herein.

An embodiment of the method defined for three different viscosities by AVC is shown in FIG. 5. After reaching the target viscosity (e.g., around 11.00 in FIG. 5) the viscosity is maintained by the AVC until the crystal growth rate is accelerated (e.g., around 305 minutes). At the crystal growth stage, the AVC heating rate cannot maintain the constant viscosity and the viscosity starts to increase. When the deflection goes below the measurable range swings in viscosity are observed due to the limited reliability of the viscosity data. Therefore, time-temperature cycle defined by AVC should be limited to the time when the viscosity cannot be maintained.

Figure 6:
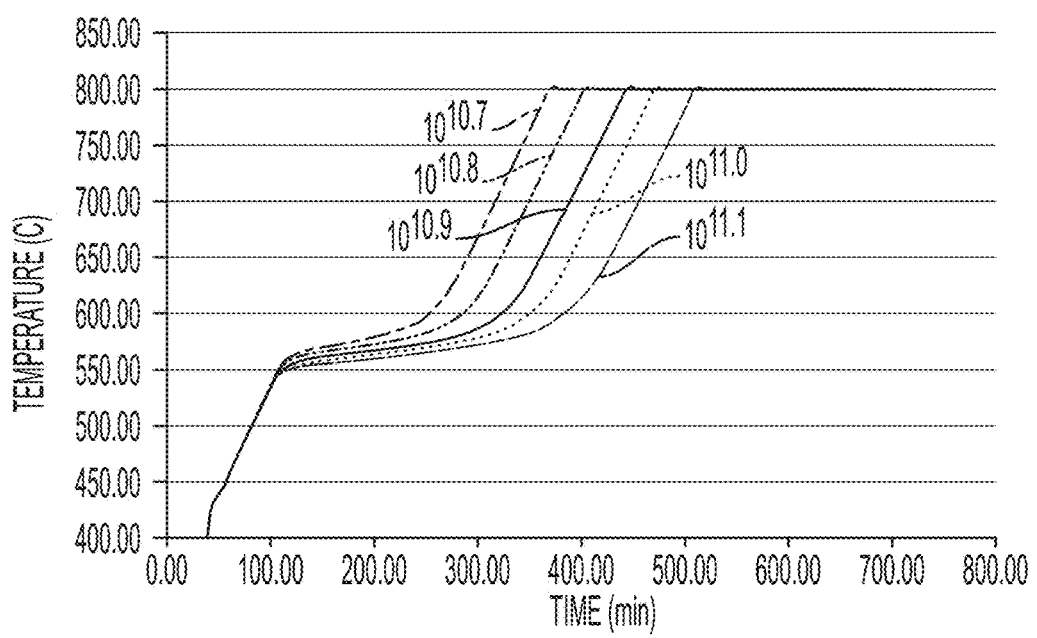
FIG. 6 graphically depicts temperature in degrees Celsius versus time in minutes of a ceram cycle according to embodiments disclosed and described herein.

FIG. 6 shows an example of a time-temperature cycle defined by AVC for 5 different target log viscosities of 10.7, 10.8, 10.9, 11.0, and 11.1. In FIG. 6 all the cycles reach the same maximum temperature because 800° C. was inputted as the maximum temperature in the software. Above this temperature AVC would not be expected to control viscosity and, thus, is not monitored or controlled in embodiments. Similarly, after the transition is complete the heating rate is linear and the same value for each composition. This corresponds to the maximum heating rate value provided to the software to avoid overheating when the deflection rate (viscosity) is out of the measurement range. Therefore, the data obtained from AVC is limited to the range in the initial nucleation and the non-linear transition range. Again, this data does not accurately depict the process during the crystal growth stage. To measure the process during the crystal growth stage, in-situ density is monitored.

Figure 7:
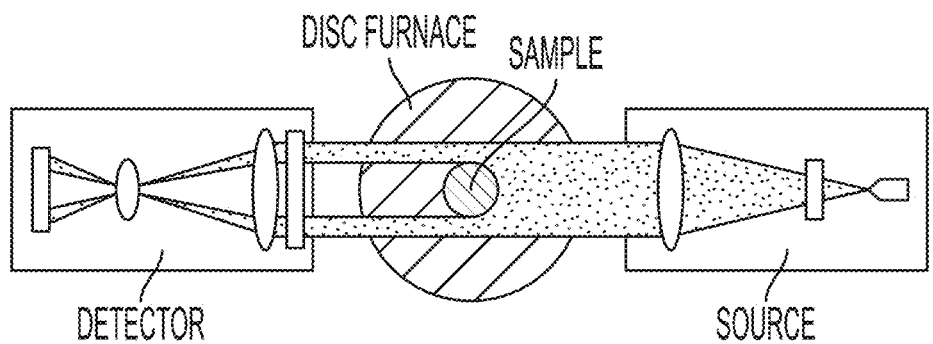
FIG. 7 schematically depicts a dilatometer that can be used in-situ to measure the density of a glass article according to embodiments disclosed and described herein.

In-situ density was calculated, according to one or more embodiments, by measuring the strain in one dimension as a function of time and temperature and assuming the glass ceramming process is isotropic. Therefore, there is believed to be a linear correlation between the volume and one-dimensional strain. Non-contact dilatometer measurements were performed using an optical dilatometer purchased from TA Instruments model DIL806. FIG. 7 shows the measurement apparatus schematically, which includes a light source that emits light into a disc furnace and to the glass sample. After the emitted light contacts the glass sample it is transmitted to the detector that can determine the changes in the light received therein, which subsequently can be used to measure the density of the sample. Basically, this method involves measurement of the shadow of the sample on both ends while it is being heat treated in the furnace. The light source is on the opposite side of the furnace from the detector, and the movement of the shadow is correlated to the density changes during the crystal growth process. Unlike conventional dilatometry, the sample is free standing on a sample holder and no external force is applied. Ceramming processes according to embodiments often occur in the log viscosity 9-12 poise viscosity range where viscous flow due to gravitational force is negligible in the process timescales.

According to embodiments, AVC defined nucleation and transitioning time-temp cycles are provided to the optical dilatometer software. Then the final crystal growth temperatures are varied and the isothermal step input is provided longer than any expected crystal growth duration to assure the crystal growth process is completed. When the density increase reaches a saturation point, it is considered that there is no significant change in the crystal size and, therefore, the viscosity and the density is constant as a function of time. This step helps identify any unwanted crystal formation or unexpected drop in viscosity at higher than needed growth temperatures. The final assemblage and phase of the glass-ceramic can be determined and compared to the data collected from density measurements to determine how the process affects the assemblage and phase of the glass-ceramic.

As used herein, a density is considered to be constant when an absolute value of a density rate of change of the glass article is less than or equal to 0.10 $(g/cm^3)/min$, such as less than or equal to 0.09 $(g/cm^3)/min$, less than or equal to 0.08 $(g/cm^3)/min$, less than or equal to 0.07 $(g/cm^3)/min$, less than or equal to 0.06 $(g/cm^3)/min$, less than or equal to 0.05 $(g/cm^3)/min$, less than or equal to 0.04 $(g/cm^3)/min$, less than or equal to 0.03 $(g/cm^3)/min$, less than or equal to 0.02 $(g/cm^3)/min$, less than or equal to 0.01 $(g/cm^3)/min$, or 0.00 $(g/cm^3)/min$. These ranges include all ranges and subranges included in the broadly disclosed ranges.

Figure 8:
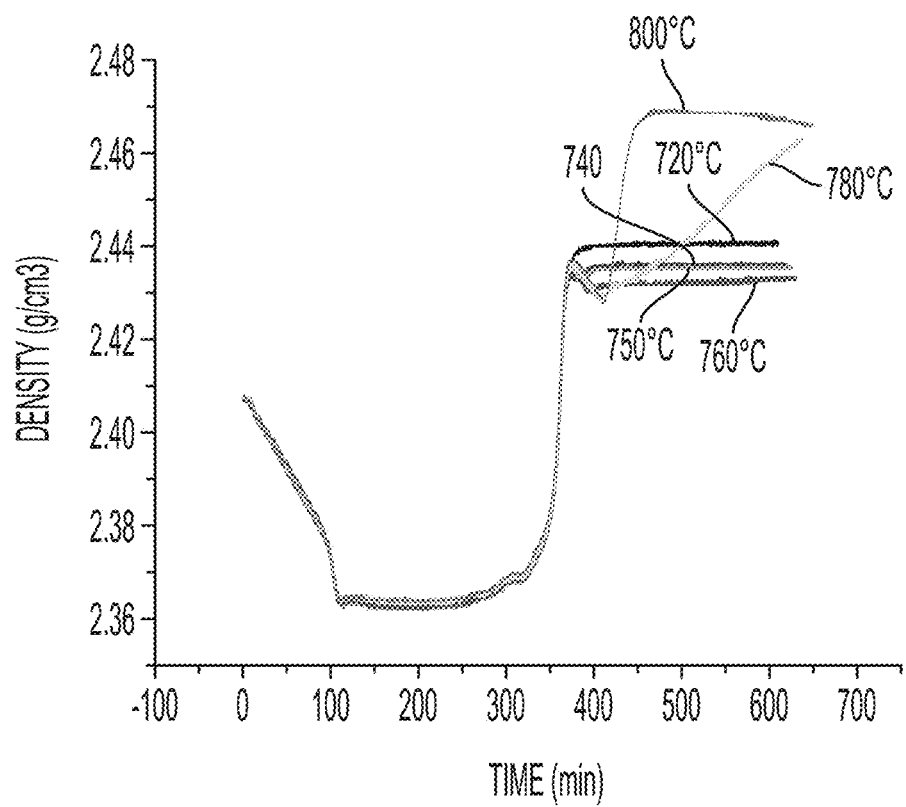
FIG. 8 graphically depicts density in grams per cubic centimeter versus time in minutes of a ceram cycle according to embodiments disclosed and described herein.

FIG. 8 shows the evolution of density at six different growth temperatures according to an embodiment. When the density reaches the plateau, the process is considered to be complete or close to being completed, and with the help of other characterization methods such as x-ray diffraction (XRD) it can be confirmed and used as the duration of the last step of the ceramming process. At high temperatures (i.e., 780° C. and 800° C.) there is a non-monotonic change in density, possibly due to formation of undesired phases or phase separation.

Figure 9:
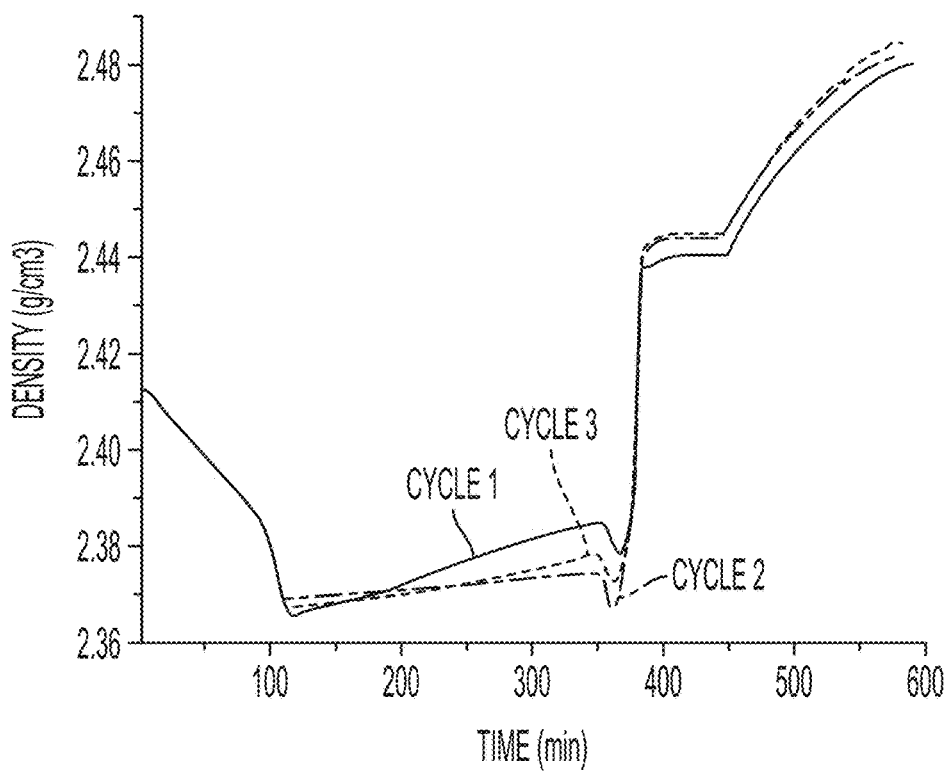
FIG. 9 graphically depicts density in grams per cubic centimeter versus time in minutes of a ceram cycle according to embodiments disclosed and described herein.

According to embodiments, it is desirable to modify the glass-ceramic ceramming cycle to achieve minimal warp. In-situ density measurement of the glass-ceramic during the ceramming process for various ceramming schedules is shown in FIG. 9. In FIG. 9, the density in grams per cubic centimeter (as measured on the y-axis) is plotted versus time in minutes (as measured on the x-axis) is shown. This figure shows that the glass article not only goes through the temperature dependent thermal expansion and shrinkage, but also goes through dynamic, time dependent non-thermal shrinkage during nucleation, ramping, and growth stages. As shown in FIG. 9, during the nucleation hold at a constant temperature (i.e., from about 100 minutes to about 350 minutes) the part is shrinking due to the material change, indicated by the density increasing. During the ramping from nucleation to growth, the density is seen to first decrease and then increase quickly, the latter in response to fast crystallization induced material shrinkage.

Figure 10:
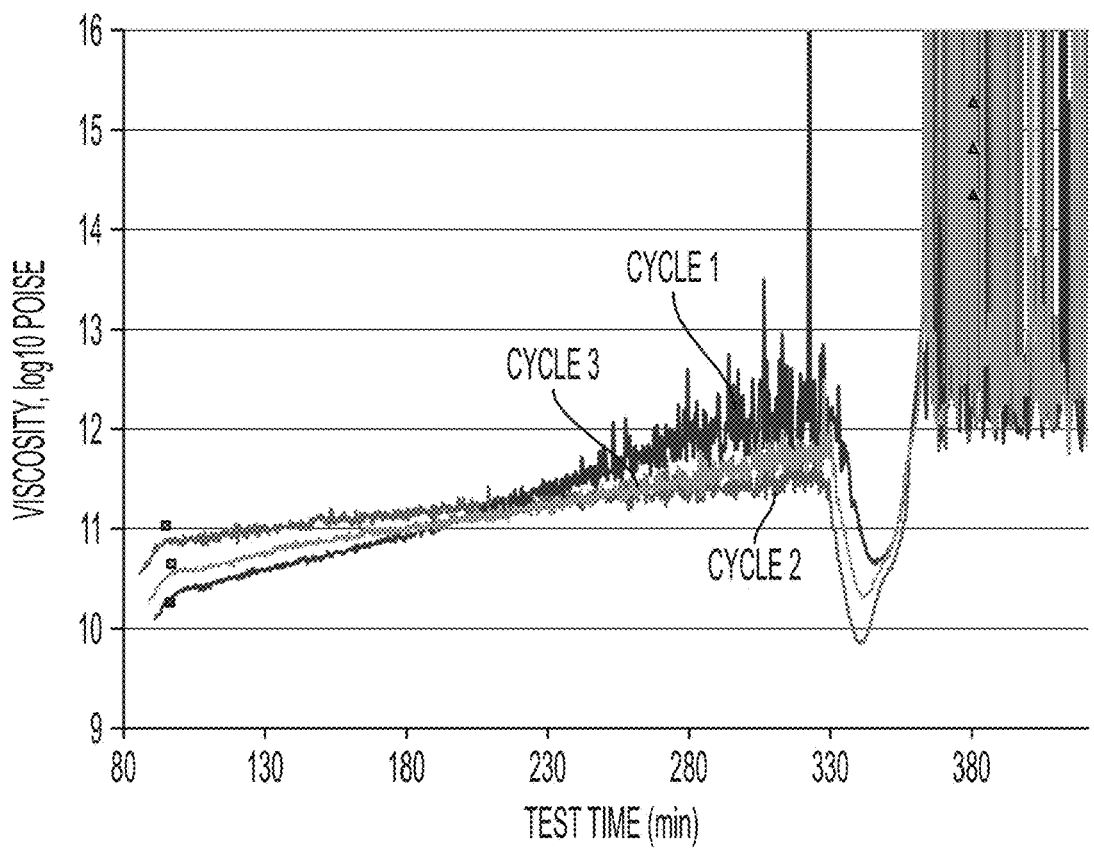
FIG. 10 graphically depicts viscosity in log 10 poise versus time in minutes of a ceram cycle according to embodiments disclosed and described herein.
Figure 11:
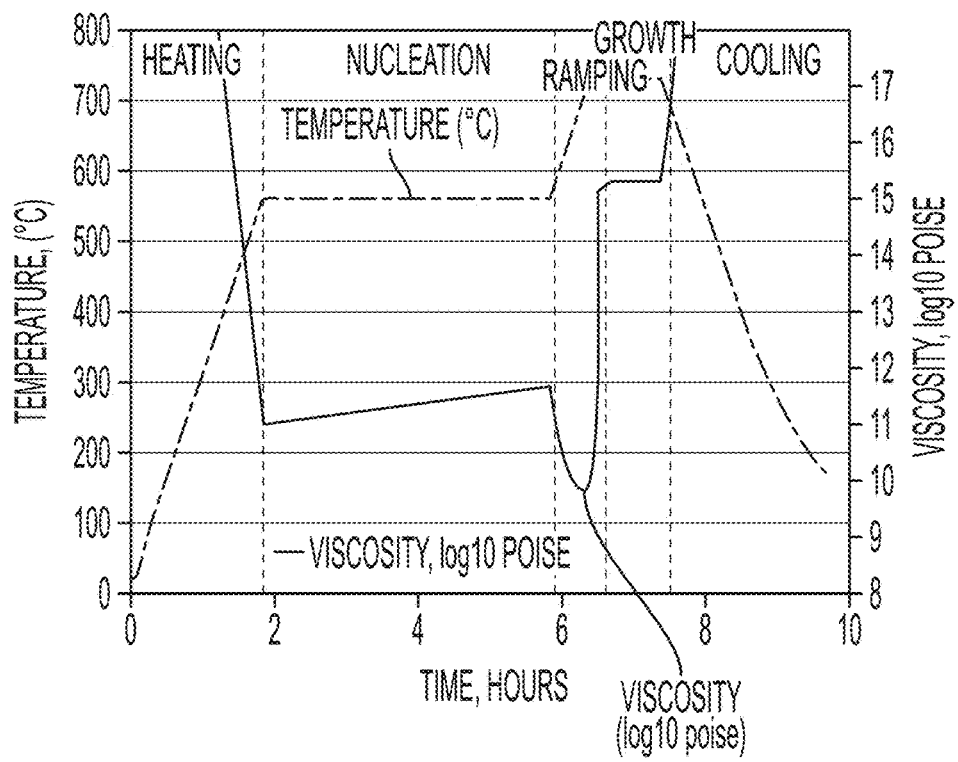
FIG. 11 graphically depicts temperature in degrees Celsius on the left y-axis versus time in hours on the y-axis, and viscosity in log 10 poise on the right y-axis versus time in hours on the x-axis of a ceram cycle according to embodiments disclosed and described herein.

FIG. 10 shows the in-situ viscosity measurement of the glass-ceramics during the ceramming process for various ceramming cycles according to embodiments described in FIG. 9. In FIG. 10, the y-axis indicates the log viscosity (log 10) poise and the x-axis indicates the test time in minutes. The viscosity has similar temperature dependent and time dependent non-thermal behaviors during the nucleation stage. During the nucleation hold at a constant temperature, the viscosity is increasing with a rate dependent on the nucleation temperature. During ramping, the viscosity first decreases and then increases, creating a dipping and a local minimum. Beam bending viscosity (BBV) measurement data for the precursor glass and ceram are used, together with the in-situ viscosity measurement data, to come up a unified ceramming viscosity model, as shown in FIG. 11. The composition of the glass shown in FIG. 10 is shown in Table 1 below.

TABLE 1

| Component | Wt % |
|---|---|
| $SiO_2$ | 73.89 |
| $Al_2O_3$ | 7.60 |
| $P_2O_5$ | 2.11 |
| $Li_2O$ | 11.50 |
| $Na_2O$ | 0.05 |
| $K_2O$ | 0.15 |
| $ZrO_2$ | 4.24 |
| $SnO_2$ | 0.40 |
| $Fe_2O_3$ | 0.06 |

Figure 12A:
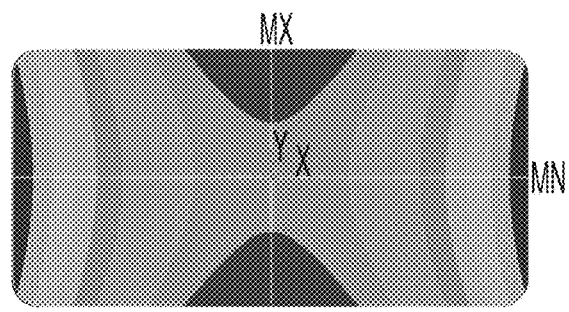
FIG. 12A shows the warp of a glass-ceramic article cerammed by a ceram cycle according to embodiments disclosed and described herein.
Figure 12B:
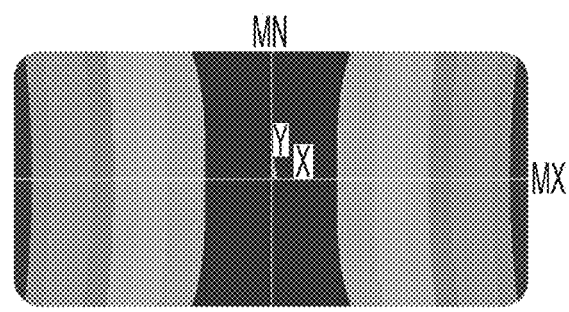
FIG. 12B shows the warp of a glass-ceramic article cerammed by a ceram cycle according to embodiments disclosed and described herein.
Figure 12C:
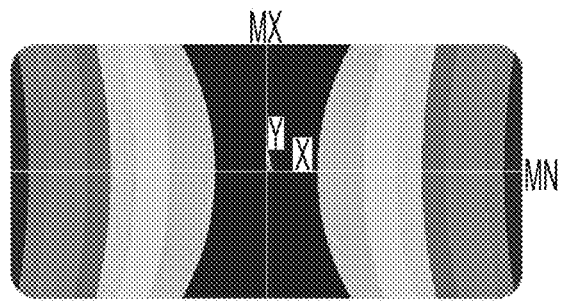
FIG. 12C shows the warp of a glass-ceramic article cerammed by a ceram cycle according to embodiments disclosed and described herein.

Viscoelastic numerical simulations are then performed in embodiments to understand the impacts of these viscosity changes on the warp. The numerical modeling discovered that the local minimum viscosity, combined with in-plane temperature gradients generated during the ramping, can trigger viscous buckling and cause warp. FIGS. 12A-12C show the warp for three hypothetical cycles (A, B, C). Cycle A is the base case, Cycle B has a faster viscosity increasing rate during nucleation and has higher minimal viscosity during ramping, and cycle C has the slower viscosity increasing rate during nucleation and has lower minimal viscosity during ramping. The warp values for these cases are: C>A>B, (shown in FIG. 12C, FIG. 12A, and FIG. 12B, respectively). Lower minimal viscosity will generate larger viscous buckling warp. In other words, increasing minimal viscosity is beneficial for reducing the buckling warp.

In embodiments, the minimum viscosity may be maintained at greater than or equal to log viscosity 11.0 poise for any and/or all of the ramp and hold portions of the heating cycle. For example, the minimum viscosity may be maintained at greater than or equal to log viscosity 11.0 poise for the ramp to the first heat ramp, the second heat ramp, or the entirety of the heat treatment cycle. In embodiments, the minimum viscosity may be maintained at greater than or equal to log viscosity 11.0 poise for any and/or all of the ramp and hold portions of the heating cycle. In embodiments, during at least the nucleation stage, the viscosity of the glass article may be maintained at less than log viscosity 11.0 poise, which may be desired when 3D forming the glass article during the heat treatment.

Figure 13A:
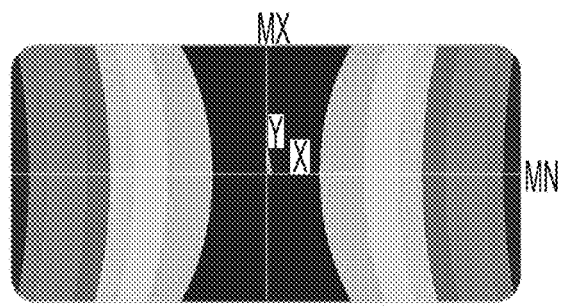
FIG. 13A shows the warp of a glass-ceramic article cerammed by a ceram cycle according to embodiments disclosed and described herein.
Figure 13B:
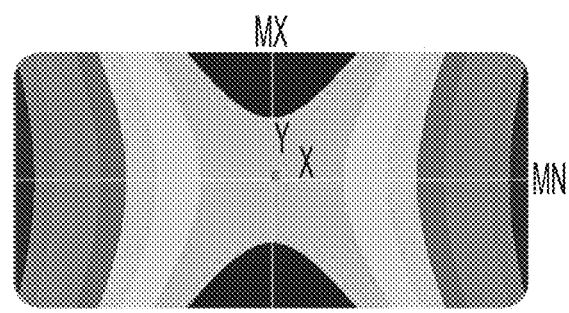
FIG. 13B shows the warp of a glass-ceramic article cerammed by a ceram cycle according to embodiments disclosed and described herein.
Figure 13C:
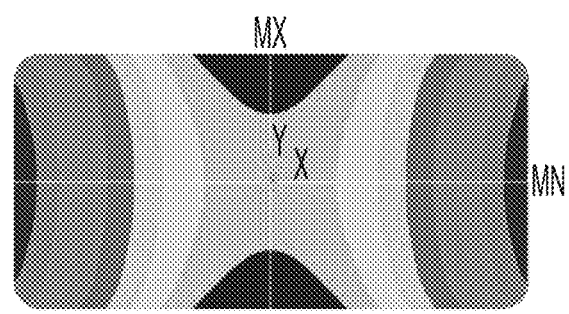
FIG. 13C shows the warp of a glass-ceramic article cerammed by a ceram cycle according to embodiments disclosed and described herein.

FIGS. 13A-13C show the warp for three ceramming cycles corresponding ±10° C. nucleation temperature and growth temperature. Cycle A is conducted at 560° C. nucleation temperature 4 hr, 730° C. growth temperature 1 hr (shown in FIG. 13A), cycle D is conducted at 570° C. nucleation temperature 4 hr, 740° C. growth temperature 1 hr (shown in FIG. 13B), cycle E is conducted at 580° C. nucleation temperature 4 hr, 750° C. growth temperature 1 hr (shown in FIG. 13C). The warp values for these cases are: E<D<A. Again it shows the same trend that increasing minimal viscosity will reduce the buckling warp. In cycle E, where the minimal viscosity during ramping is kept above log viscosity 11.0 poise, the resulted warp is very small, such as <1 µm.

When the objective is to ceram a flat piece of glass with minimum warp, cycle E would be preferred, in some embodiments, to other cycles due to low value of minimum viscosity during the growth ramp. Note that the lower viscosity for cycle E during the nucleation phase is less likely to cause buckling because of lower ΔT during periods of temperature hold (compared to periods of temperature ramp).

More generally, cycles that generate higher "minimum viscosity" during the "ramp-to-growth" stage—where the highest ΔT is observed—may be preferred, in some embodiments, to minimize warp associated with buckling. This could be referred to as the "minimum viscosity" during the ramp stage, and the modeling could be used to predict impact of that minimum value relative to the final warp as a screening tool.

Besides increasing the local minimal viscosity to reduce buckling warp, it is also possible to apply some weight constraining force to increase the buckling threshold. In a stack configuration, having the weight on the top of the stack sufficient to prevent buckling of the topmost piece of glass would ensure that the layers below do not buckle as well. Application of a weight constraining force to the top of the stack may also reduce the minimum acceptable viscosity for the prevention of buckling of the glass article.

Figure 14:
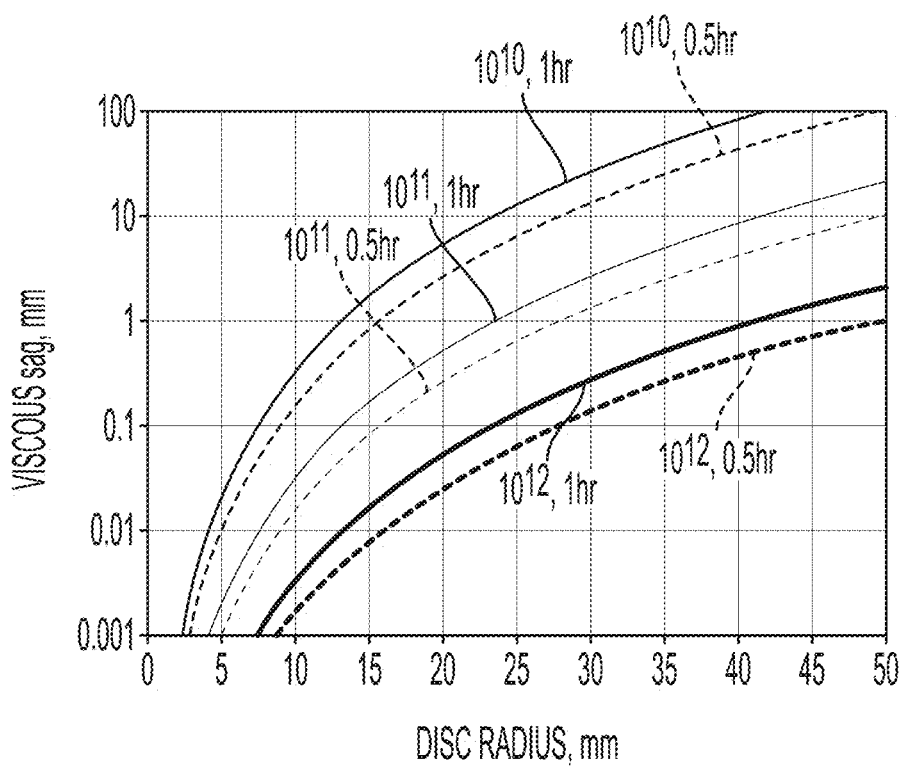
FIG. 14 graphically depicts viscous sag in mm versus disc radius in mm of a glass-ceramic article cerammed by a ceram cycle according to embodiments disclosed and described herein.

As the part is put horizontally on the setter material, the gravity can also generate warp, besides the viscous buckling induced warp, if the setter is not flat. Viscous sagging analysis is shown in FIG. 14. In an area of 30 mm diameter, at log viscosity 11.0 poise and 0.5 hr, the viscous sagging will reach about 100 µm. FIG. 14 suggests that larger area (>30 mm diameter)/lower viscosity (log viscosity <11 poise)/longer duration (>0.5 hr) will generate viscous sag >100 µm. If the setter has flatness better than 100 µm, the glass will sag and conform to the setter at those conditions. If the setter has flatness larger than 100 µm, the viscous sag will also be larger than 100 μm. Therefore the setter needs to be flat (e.g., less than or equal to 100 microns) for minimal gravity induced warp.

When the objective is to form the glass into 3D shapes, then cycles with lower viscosities would be preferred, in some embodiments, and the application of forming pressure would coincide with the periods of low viscosities during the cycle. 3D forming may be done before nucleation, during the nucleation, during the nucleation-to-growth ramp, and in some cases even during the growth hold stage. The right choice may depend on various factors, such as the 3D geometry to be formed, viscosities during each stage (which depends on temperature, time and ramp rates), and warp. For example, as ceramming 3D formed glass can lead to substantial warp, forming pre-nucleated glass may be a means of reducing the final post-ceram warp of the 3D article.

When 3D forming is to be done during the nucleation hold, cycle E (described above with reference to FIG. 13) may be preferred, in some embodiments, to cycles A and D as it has lower viscosity than the other cycles for about 100 mins starting at the beginning of the nucleation hold. Results of FIG. 14 show that for curve E, viscosity is low enough to cause several millimeters of sag under gravity within 60 minutes. Thus many 3D shapes can be formed under these conditions with the aid of additional forming pressure during the nucleation hold stage. In the case of one-mold forming, such pressure can be in the form of partial or full vacuum on the side of the mold, or positive gas pressure (typically $N_2$ or air) on the other side of the forming mold. In the case of two (or multiple-) mold pressing, the pressure is applied from both sides.

Alternatively, in embodiments, 3D forming may be done completely in the nucleation to growth ramp stage. In such a case, cycle A would be preferred, in some embodiments, to cycles D and E. In that case the buckling risk is still managed due to the mold contact/forming pressure constraining force.

New cycles may also be conceived for forming during nucleation. As an example, the nucleation temperature can be increased further, such as to 590° C., 600° C., or even 610° C. during a first part of the cycle, held for just enough time for the 3D forming to be completed, then lowered for the rest of the cycle (with shortened duration of nucleation hold, if needed) so that the final crystal content at the end of the cycle remains the same as for the base cycle A. The higher temperatures would create lower viscosities initially and allow forming of more challenging shapes in a shorter amount of time. Having the same crystal content as base case would mean, besides having the desirable distribution of phases, that the low viscosity of curve A during ramp to growth could be replicated giving another opportunity to complete 3D forming.

3D forming and ceramming may be done in the same cycle or in multiple cycles. For example, in one embodiment, the precursor glass may be formed into the 3D shape and then a separate cycle may be used to ceram the 3D article. In another embodiment, the glass preform may be partially or fully "pre-nucleated" in a first cycle, then 3D formed in a second cycle, and then ceramming may be completed either in the second cycle or in a third, separate cycle. As 3D forming can be only done one glass article at a time, pre-nucleating the glass preform—versus nucleation and 3D forming in the same cycles—may increase throughput by allowing stacked configurations in nucleation.

The temperature ramp to growth is a natural choice for 3D forming when the glass preform is fully pre-nucleated. As stated earlier, cycle A may be preferred, in some embodiments, to cycles D or E in such a case, because of lower viscosity during ramp to growth. When the glass is only partially pre-nucleated, 3D forming may be done either during nucleation, during the ramp to growth, or partly during nucleation and partly during the ramp to growth.

To prevent warp of the 3D article during the ceramming cycle, ceramming may be done on mold (one piece, two piece, or three piece), temperature gradients should be kept low (e.g. by using molds of high thermal conductivity material such as graphite or SiC) and load should be applied to force the 3D article to remain conformed to the mold during ceramming.

As disclosed above, precise control of the glass article temperature is required to achieve a desired glass-ceramic article. Accordingly, thermal uniformity within the heating apparatus, such as, for example, a lehr or a furnace, and within the glass stack is an important attribute of the process, according to embodiments. For example, in embodiments, the temperature imparted to the stack varies by less than or equal to ±8° C., such as less than or equal to ±7° C., less than or equal to ±6° C., less than or equal to ±5° C., or less than or equal to ±4° C., where the temperature is measured on the glass sheets themselves.

To achieve the above-described thermal uniformity, thermal mapping is conducted on the interior chamber of an empty heating apparatus before inserting fixtures (such as the carrier, setters, and glass stack) into the heating apparatus. The thermal mapping of the empty heating apparatus chamber is conducted to determine the usable heating space within the heating apparatus chamber by defining the space that can maintain thermal uniformity within a desired tolerance. For example, portions of the heating apparatus chamber that cannot maintain a thermal uniformity of less than or equal to ±8° C. from the programmed cycle temperature will be excluded from the heating space in which glass stacks can be placed. Subsequent to mapping the empty heating apparatus chamber to determine the usable heating space, fixtures are placed into the now-defined heating space and the thermal uniformity with the glass stacks is measured to determine whether glass sheets within a given glass stack can be maintained within a desired temperature tolerance of the programmed cycle temperature. Once the thermal uniformity is determined, the glass stacks may be configured and placed into the heating space in such a way as to take advantage of the thermal uniformity measurements that were obtained.

Methods for determining thermal uniformity within an interior chamber of a heating apparatus will now be described with reference to FIG. 15A and FIG. 15B. The placement of measurement devices (such as, for example, thermocouples) within the chamber of the heating apparatus should, in embodiments, account for the heating apparatus design, such as, for example, walls, doors, heating elements, vents, etc. of the chamber of the heating apparatus. The measurement devices should be placed in locations and away from design elements so that any thermal non-uniformity caused by such design elements is ameliorated during the thermal mapping process. In addition, measurement devices should be placed in the chamber of the heating apparatus in such a way that thermal uniformity of entire heating space can be determined. For instance, the measurement devices should be placed within the heating apparatus chamber such measurements are made at numerous locations within the chamber of the heating apparatus to minimize any "dead spots" or locations where there are no measurements.

Figure 15A:
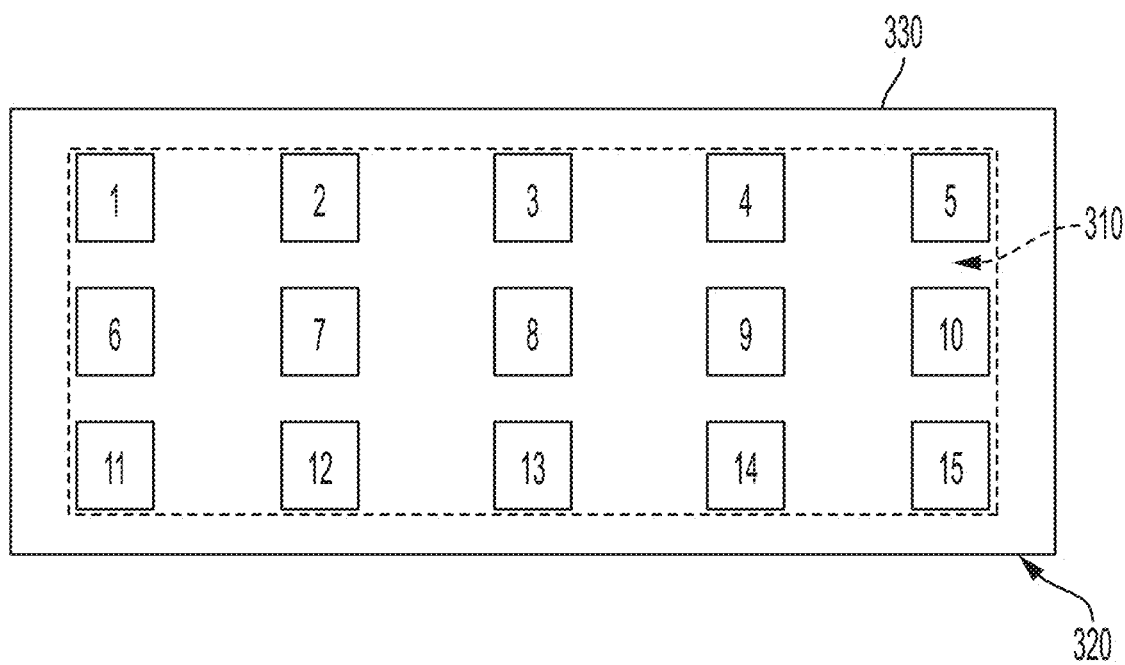
FIG. 15A graphically depicts the horizontal location of measurement devices within a chamber of a heating apparatus according to embodiments disclosed and described herein.
Figure 15B:
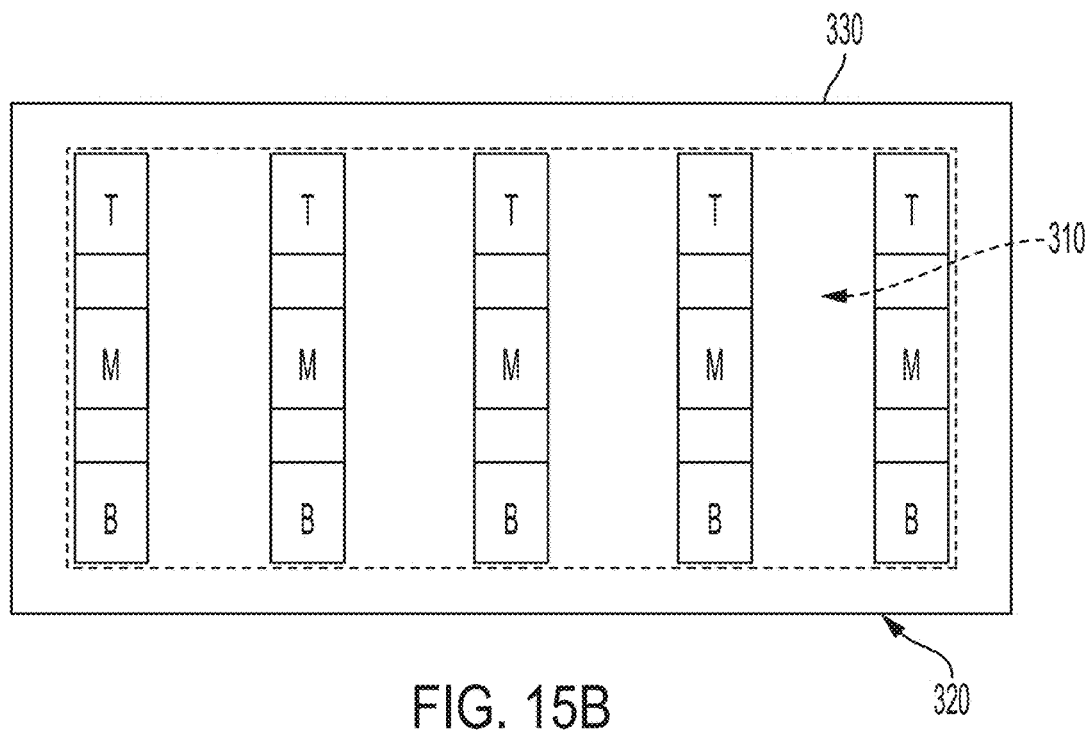
FIG. 15B graphically depicts the vertical location of measurement devices within a chamber of a heating apparatus according to embodiments disclosed and described herein.

FIG. 15A and FIG. 15B show the horizontal and vertical placement, respectively, of measurement devices within the chamber of a heating apparatus. Initially, an expected heating space 310 (indicated by the space within the dashed lines in FIG. 15A and FIG. 15B) is approximated taking into account the design elements of chamber of the heating apparatus. As shown in FIG. 15A and FIG. 15B, the expected heating space 310 is selected such that there is space between the top, bottom, and side walls of the chamber of the heating apparatus. FIG. 15A shows the horizontal placement (i.e., view from the top or bottom of the chamber of the heating apparatus) of measurement devices according to embodiments. As shown in FIG. 15A there are fifteen measurement devices (elements 1-15) placed in a spaced configuration in each horizontal cross-section of the chamber of the heating apparatus. The horizontal placement of measurement devices 1-15 in the chamber of the heating apparatus according to the embodiment depicted in FIG. 15A would be expected to provide adequate thermal mapping of the horizontal space of the chamber of the heating apparatus. However, it should be understood that other horizontal configurations of measurement devices may be used in alternative embodiments.

Similarly, FIG. 15B shows the vertical placement (i.e., side view) of measurement devices in the chamber of a heating apparatus. Three rows of measurement devices—top, middle, and bottom represented respectively by "T", "M", and "B" in FIG. 15B—are placed into the chamber of the heating apparatus in a spaced configuration. The vertical placement of measurement devices in the top, middle, and bottom rows within the chamber of the heating apparatus according to the embodiment depicted in FIG. 15B would be expected to provide adequate thermal mapping of the vertical space of the chamber of the heating apparatus. However, it should be understood that other horizontal configurations of measurement devices may be used in alternative embodiments. When viewed together, FIG. 15A and FIG. 15B show 45 measurement devices (three rows—top, middle, and bottom—of fifteen measurement devices) in a spaced configuration that would be expected to adequately map the thermal properties of the expected heating space 310. However, it should be understood that other configurations of measurement devices may be used in alternative embodiments.

In embodiments, the measurement devices are arranged at a minimum of each corner, all centerlines, and all center of volume points within the expected heating space. If thermally non-uniform design elements are present, additional measurement devices may be placed near such elements to map the effect of these elements on thermal uniformity and to determine how close the heating space may come to these thermally non-uniform design elements. The vertical placement of the measurement devices should account for and will, in embodiments, dictate the height of the glass stacks and/or fixtures that may be placed within the chamber of the heating apparatus. If the top or bottom surface of the chamber of the heating apparatus is heated or non-heated, adjacent measurement devices should account for the heater element locations and any other non-planar surface that may upset or interrupt the thermal response of the measurement device. Vertical spacing of an empty chamber of the heating apparatus is, in one or more embodiments, every 25 mm from the bottom 320 of the chamber of the heating apparatus to a distance that is between 50 and 100 mm from the top 330 of the chamber of the heating apparatus.

Once the measurement devices are placed into the empty chamber of the heating apparatus, a heating cycle is conducted. According to embodiments, the heating cycle may include the same heating conditions as a cycle for ceramming glass articles. During this heating cycle, the measurement devices periodically or consistently measure the temperature at their respective locations within the chamber of the heating apparatus. These temperatures that are measured by the measurement devices can then be analyzed and compared to determine whether one or more locations within the chamber of the heating apparatus do not fall within a desired tolerance, such as, for example ±8° C., of the programmed cycle temperature. If one or more locations of the chamber of the heating apparatus do not fall within the desired tolerance, those locations of the chamber of the heating apparatus will be excluded from the heating space that can be used in the ceramming cycle. In embodiments, if one or more locations of the chamber of the heating apparatus do not fall within the desired tolerance additional thermal mapping may be conducted by moving the measurement devices to exclude the locations within the chamber of the heating apparatus that did not fall within the desired tolerance and running one or more additional heating cycles. This process may be repeated any number of times to determine the heating space within the chamber of the heating apparatus that can be kept within the desired tolerances.

Once the measurement devices are in locations such that all measured locations of the chamber of the heating apparatus fall within the desired tolerance, the space within the chamber of the heating apparatus defined by the measurement devices will be considered the heating space. In embodiments, once the heating space has been determined, glass stacks and fixtures (such as, for example, carriers) can be designed and/or configured so that they fit within the heating space. The designed glass stacks and fixtures are then loaded into the heating space within the chamber of the heating apparatus, and the measurement devices in the center of the heating space are removed to accommodate the fixtures. A heating cycle that is, in embodiments, the same as the heating cycle used to determine the heating space is conducted to determine the effect that the fixtures have on the thermal uniformity within the heating space. Adjustments can then be made to the programmed thermal profile to accommodate for the effect of the fixtures and the glass stacks.

According to embodiments, after the heating space within the chamber of the heating apparatus and the effect of the glass stacks and fixtures on the thermal response have been determined, the thermal uniformity within glass stacks may be found by placing measurement devices into the glass stacks, and removing any measurement devices used to in the previous steps of determining the heating space and the effect of the glass stacks and fixtures on the thermal responsiveness.

Measurement device placement within the glass stack is important to provide reliable and repeatable data, according to embodiments. The thermal conductivity of the glass should be accounted for in each layer, thus having only one sheet of glass between the setter and the measurement device will provide sufficient thermal characterization of the glass sheets and will capture the thermal influence of the setter on the stack. Accordingly, the number of measurement devices included in the glass stack will vary in embodiments according to the physical dimensions of the glass stack and the desired detail of the thermal mapping. For instance, in one or more embodiments, nine measurement devices may be placed in the stack where three measurement devices are placed along the centerline of a glass sheet that is below the top setter; three measurement devices are placed along the centerline of a glass sheet that is in the geometrical center of the glass stack; and three measurement devices are placed along the centerline of a glass sheet that is one sheet above the bottom setter. The centerline, as used in this example, is a line drawn lengthwise across the glass sheet substantially parallel to two edges of the glass sheet and substantially perpendicular to the other two edges of the glass sheet and intersecting the geometrical center of the glass sheet. It should be understood that "substantially parallel" and "substantially perpendicular" as used herein means that the centerline is parallel or perpendicular, respectively, to such edges taking into account irregularities of the edges from manufacturing. In the embodiment disclosed above where three measurement devices are placed along a centerline of a glass sheet, a measurement device (such as, for example, a thermocouple) is placed on the centerline near the left side of the glass sheet, a measurement device is placed at the geometrical center of the glass sheet, and a measurement device is placed along the centerline of the glass sheet near the right side of the glass sheet. This configuration is followed for all three glass sheets in question. The middle layer of the stack typically provides a median reference of the entire stack. It should be understood that the above-disclosed configuration of measurement devices is exemplary only and other configurations may be used in embodiments depending on the desired specificity of the thermal mapping desired. For example, in embodiments where thermal uniformity is to be strictly controlled, more measurement devices will be placed on each glass sheet to get more detailed thermal mapping. Any number of measurement devices may be used in the glass stack so long as the number of measurement devices does not substantially interfere with the thermal profile of the glass sheets. All layers of the measurements can then be measured to understand the thermal profile of the glass response to the thermal profile as programmed, as discussed in more detail below.

Figure 16:
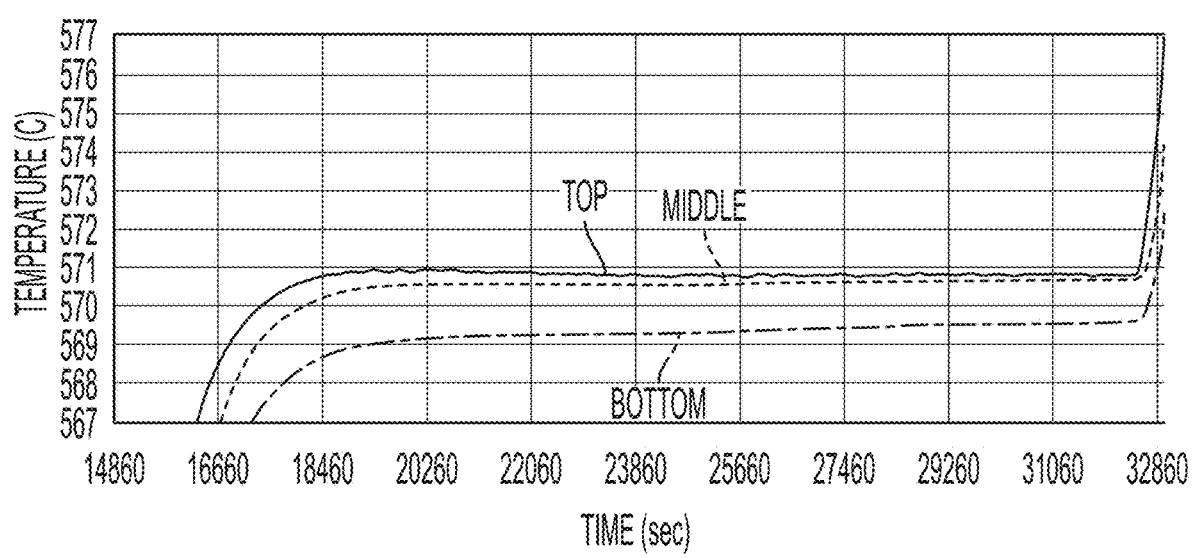
FIG. 16 graphically depicts temperature in degrees Celsius versus time in seconds as recorded by measurement devices in an empty chamber of a heating apparatus according to embodiments disclosed and described herein.

FIG. 16 shows a stack glass temperature differential ($\Delta T$) between the top (i.e., the glass sheet below the top setter), middle (i.e., the glass sheet at the geometrical center of the glass stack), and bottom (i.e., the glass sheet above the bottom setter) of the glass stack as measured by a measurement device positioned at or near the geometrical center of the respective glass sheet. Such a graph can be used to understand the magnitude and location of temperature deviations. FIG. 16 shows the temperature of a glass stack having 18 glass sheets and three setters dispersed within the stack such that there are six glass sheets between two respective setters. As shown in FIG. 16, the glass sheet located near the bottom of the glass stack has a lower temperature than both the glass sheet located near the middle of the glass stack and the glass sheet located near the top of the glass stack. This determination becomes integral because post-ceramming metrology variability of expected attributes, such as color, haze, stress, phase assemblage, etc. can be impacted by the time and temperature at which the glass article is ceramed. Accordingly, understanding and controlling the temperature differential between glass sheets in the glass stack has an impact on the final properties of the glass-ceramic article.

The temperature difference from the expected thermal profile is, in embodiments, measured and analyzed in both the vertical and horizontal planes. Vertical $\Delta T$ is typically impacted by setter material selection, glass stack height, and heating and cooling rates of the process equipment. Horizontal $\Delta T$ is typically impacted by non-uniformities of the process equipment, placement of the glass stack within the heating space, and the heating design (how heat is directed to the glass stack). Controlling the $\Delta T$ within the stack is important to obtain uniformity of the glass sheets at high throughputs, according to embodiments. It should be understood that the tolerances for $\Delta T$ will vary depending on the glass composition as well as the desired attributes of the final glass-ceramic article.

Figure 17:
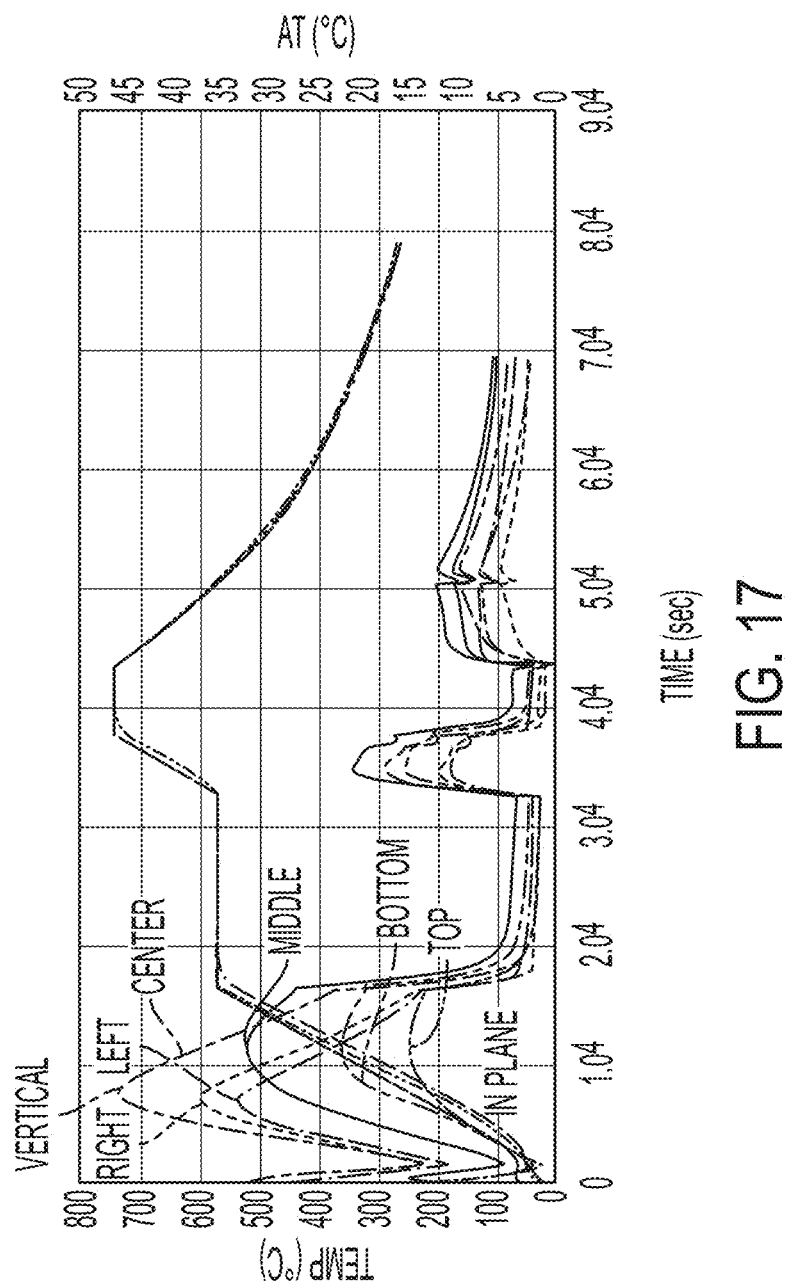
FIG. 17 graphically depicts the temperature of glass sheets in degrees Celsius on the left y-axis versus time in seconds on the x-axis and the temperature differential between glass sheets in degrees Celsius on the right y-axis versus time in seconds on the x-axis when cerammed by a ceram cycle according to embodiments disclosed and described herein.

In embodiments where the glass article has a glass composition as disclosed and described herein $\Delta T$ within the glass stack may be maintained within $\pm 5°$ C. of the programmed temperature profile during the isothermal hold (also referred to as "soak") stages of the ceramming process (i.e., stages corresponding to the nucleation stage and the growth stage). When $\Delta T$ is outside of this tolerance in the isothermal hold during the nucleation and growth stages, various glass-ceramic sheets from the resulting ceramming process can have undesirable attributes, such as warp, bow, haze, etc. FIG. 17 shows results from a glass stack comprising eighteen measurement devices. In FIG. 17, the x-axis is time measured in seconds, the right y-axis is $\Delta T$ in ° C., and the left y-axis is temperature of the glass sheets in ° C. The tight grouping of plotted lines represent the temperature of the glass sheet (corresponding to the left y-axis), and the wider grouping of plotted lines show $\Delta T$ of the glass sheets (corresponding to the right y-axis). As shown in FIG. 17, during the first ramping cycle where the glass stack is heated from around ambient to about 570° C., $\Delta T$—as measured from the programmed creaming temperature—for some glass sheets within the glass stack is over 40° C. However, after the ramping cycle is complete and the isothermal hold begins, the $\Delta T$ of the glass sheets drops and is maintained at or below $\pm 5°$ C. during the isothermal hold. In embodiments, the ceramming cycle is modified based upon the $\Delta T$ measurements obtained.

For instance, it is desirable, in one or more embodiments, for the duration of the programmed isothermal hold to be conducted where $\Delta T$ is within $\pm 5°$ C. As shown in FIG. 17, the isothermal hold at about 570° C. begins before $\Delta T$ of the glass stack is within $\pm 5°$ C. of the programmed ceramming cycle. Thus, the programmed isothermal hold may be extended such that the original duration of the isothermal hold is conducted where $\Delta T$ is within $\pm °$ C. As a non-limiting example, if the isothermal hold at about 570° C. was originally programmed to have a duration of 4 hours, it may be desirable to hold the glass stack at a $\Delta T$ within $\pm 5°$ C. for a duration of 4 hours (i.e., matching the originally programmed isothermal hold duration). To achieve this, the isothermal hold may have to be extended beyond 4 hours to account for the time that it takes the glass stack to reach a $\Delta T$ within $\pm 5°$ C. The amount of time that the isothermal hold is modified may be determined using the data collected in way as shown in FIG. 17 and determining the amount of time it takes for the $\Delta T$ of the entire glass stack to be within $\pm 5°$ C. In one or more embodiments, the duration of the isothermal hold during the nucleation stage may be modified by +10%, such as +9%, +8%, +7%, +6%, +5%, +4%, +3%, +2%, or +1%.

Similarly to the above description, FIG. 17 shows that $\Delta T$ during the ramp cycle from about 570° C. to about 750° C. exceeds $\pm 5°$ C. and can reach more than 20° C. in certain glass sheets within the glass stack. However, as was the case at the isothermal hold during the nucleation stage at about 570° C., $\Delta T$ returns to within $\pm 5°$ C. after some time at the isothermal hold at about 750° C. during the growth stage. As was the case with the isothermal hold at about 570° C., in embodiments, it may be desirable to maintain the glass stacks at a $\Delta T$ within $\pm 5°$ C. for the original program duration of the isothermal hold during the growth stage.

Thus, the duration of the growth stage isothermal hold can be modified as described above so that the glass stack is maintained at a ΔT within ±5° C. for the originally programmed duration of the growth stage isothermal hold. In one or more embodiments, the duration of the isothermal hold during the growth stage may be modified by +10%, such as +9%, +8%, +7%, +6%, +5%, +4%, +3%, +2%, or +1%.

Figure 18:
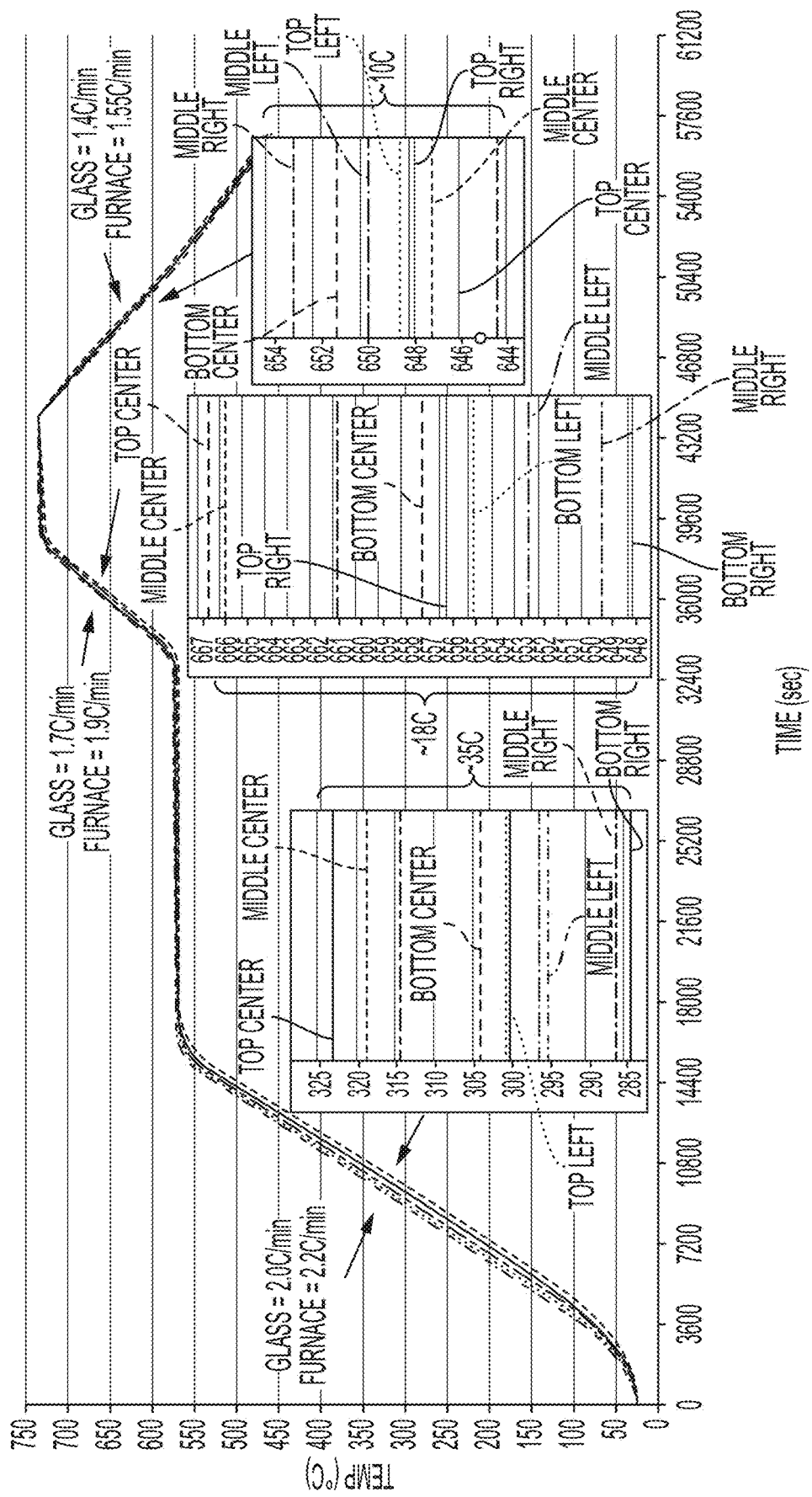
FIG. 18 graphically depicts the temperature of glass sheets in degrees Celsius versus time in seconds with expanded views of various portions of the graph of glass articles cerammed by a ceram cycle according to embodiments disclosed and described herein.

FIG. 18 represents a detailed look at the thermal response of a glass stack according to embodiments. The differences in temperature of individual sheets in the glass stack during various ramping cycles and the cooling cycle are shown in the expanded views within the graph of FIG. 18. This information helps to understand how the glass stack is thermally responding to the heating profile as programmed. Deviations of the measured temperature of the glass sheets from the heating profile as programmed during transition may or may not impact the glass attribute, but it can limit the process if the thermal processing equipment is operating at or near 100% power output to achieve the desired thermal profile. This data can be used to fine tune the thermal profiles to improve or maintain attributes of the final glass-ceramic article.

The temperature profiles within the chamber of the heating apparatus and within the glass stack provide important information that can be used, in various embodiments, to modify the programmed heating profile used during the ceramming cycle. In some embodiments, these modifications to the programmed heating profile will improve the attributes of the final glass-ceramic articles, such as, for example, the warp, bow, haze, clarity, etc. However, in other embodiments, these modifications to the programmed heating cycle may not affect the attributes of the final glass-ceramic article, but may improve the throughput of the ceramming process. However, in other embodiments, it may not be necessary to modify the programmed heating cycle based on the temperature uniformity that is measured. For instance, some end products have very demanding tolerances that require very clear, flat glass articles. For such products, it may be desirable to modify the programmed heating cycle. However, other end products may have broader tolerances for glass clarity, color, flatness, and stress. For such products, it may not be desirable to modify the programmed heating cycle based on the thermal uniformity within the glass stack.

As discussed in detail above, in embodiments, it may be desirable to modify the programmed heating cycle in view of the thermal uniformity data collected. However, it may also be possible to control the thermal uniformity within the glass stack. As mentioned above vertical AT, may be controlled by altering the stack configuration, the setter material, the setter configuration (such as inserting interlayers made of the setter material between the top setter and the bottom setter), etc. Another way that the thermal uniformity of within the glass stack can be controlled is by using multistage heating in the ceramming cycle. Slowing the ramp rate during the nucleation and/or growth stages by using multistage heating will result in the glass stacks heating more slowly and, thus, the thermal uniformity of the glass sheets will be increased. An exemplary embodiment of multistage heating is disclosed below.

Figure 19:
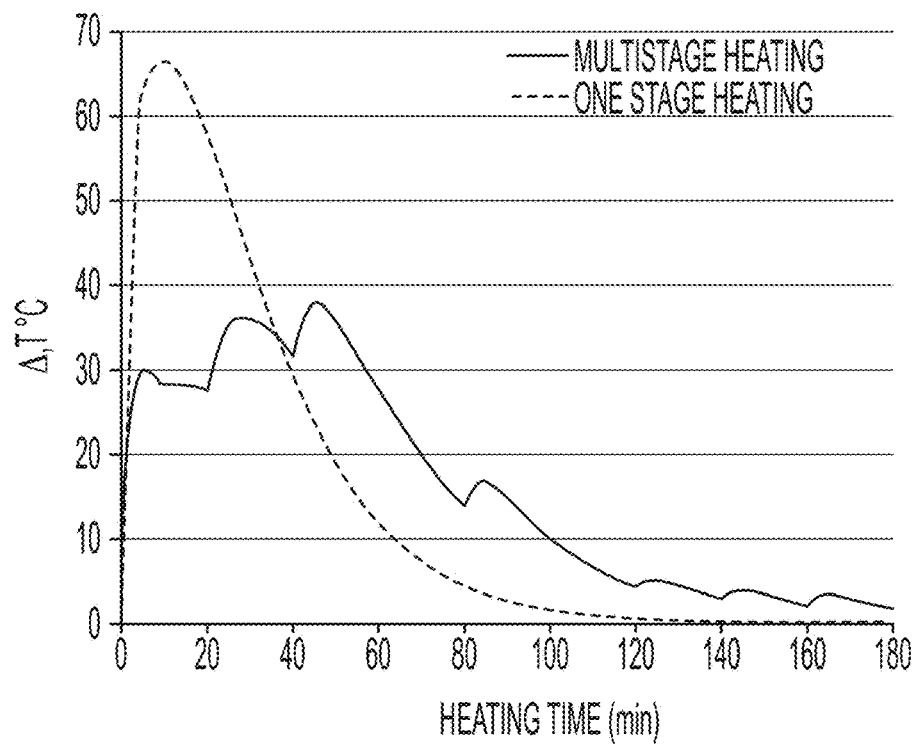
FIG. 19 graphically depicts the effect of multistage heating on the temperature differential of glass sheets in degrees Celsius versus time in minutes according to embodiments disclosed and described herein.

Glass sheet thermal uniformity can be improved by setting the heating sources (e.g., radiation heaters, convection heaters, etc.) at multiple intermediate levels during heating due to heating rate moderation. The effectiveness of this multistage heating operation can be evaluated using full scale Lehr thermal model assuming capacity with 9 stacks and 23 glass sheets in each stack on a single carrier. For heating from room temperature to the nucleation condition, a nine-stage heating scheme is studied, the controlled heater temperature levels in each stage are summarized in Table 2. A significant reduction in the glass sheet temperature variation is shown in FIG. 19 in comparison with single stage heating in which the heater is set to the nucleation temperature of 570° C. With multistage heating, the heating rate is lowered and longer heating time is required to achieve the target nucleation temperature. For the nine-stage heating as mentioned, it takes 180 minutes to reach the nucleation temperature, while single stage heating is conducted for 100 minutes. The multistage heating can be optimized to lower the thermal variation below desirable levels without adding significant amount of heating time.

TABLE 2

| Stage | 1 | 2 | 3 | 4 | 5 | 6 | 7 | 8 | 9 |
|---|---|---|---|---|---|---|---|---|---|
| Multi-stage (° C.) | 400 | 450 | 500 | 500 | 530 | 530 | 540 | 560 | 570 |
| Single Stage (° C.) | | | | | 570 | | | | |

Figure 20:
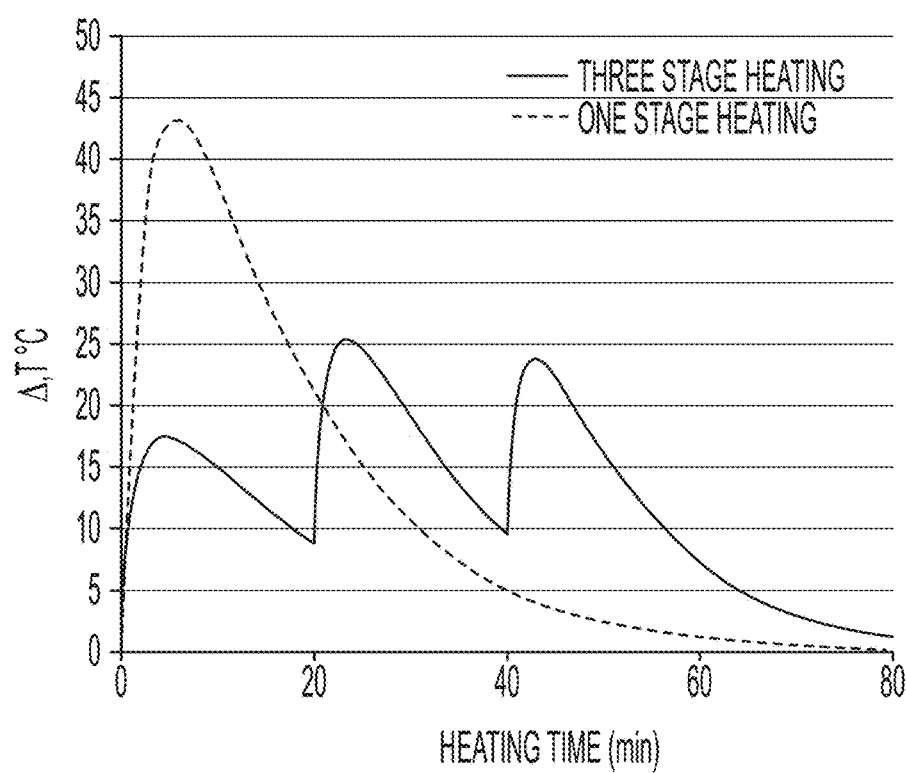
FIG. 20 graphically depicts the effect of multistage heating on the temperature differential of glass sheets in degrees Celsius versus time in minutes according to embodiments disclosed and described herein.

The multistage heater setting can be applied to the growth stage heating as well to reduce the thermal variability on the glass sheets. The same effect is illustrated in FIG. 20, which shows the maximum glass sheet temperature variation is reduced from over 40° C. to about 25° C. with three-stage heater setting. The actual heater temperature settings for the three-stage heating are 620° C., 680° C., and 740° C., while the heater is set to constant level of 740° C. for the single stage heating.

Figure 21:
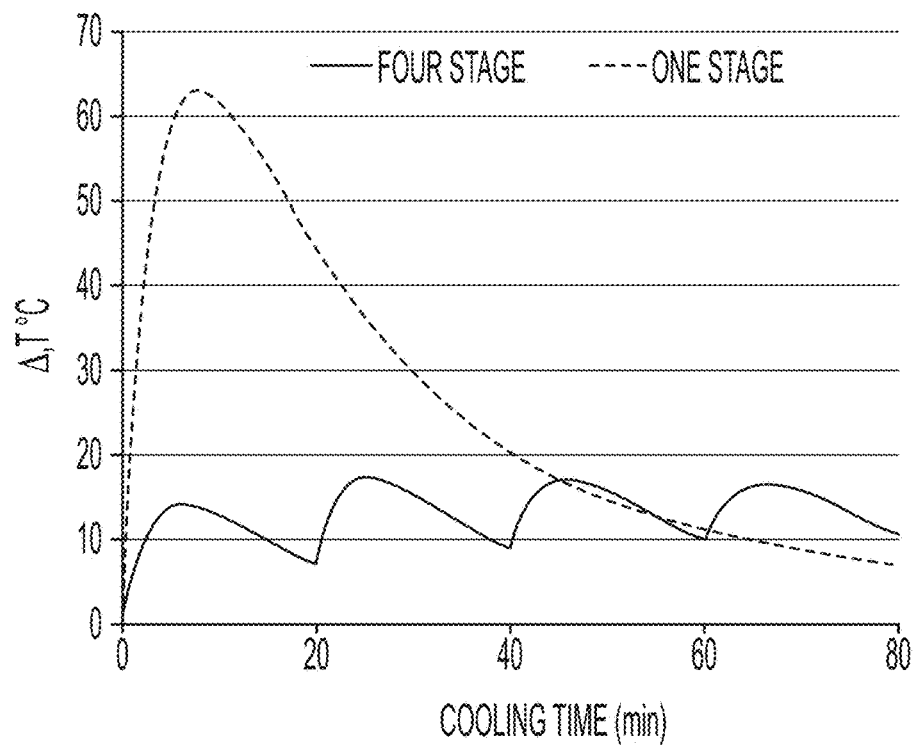
FIG. 21 graphically depicts the effect of multistage heating on the temperature differential of glass sheets in degrees Celsius versus time in minutes according to embodiments disclosed and described herein.

Maintaining thermal variability at low levels during post growth cooling is important, in embodiments, to meet glass-ceramic product stress and warp requirements. By controlling the thermal environment to which the hot glass stacks radiate heat out, the cooling rate can be moderated, which potentially lowers the glass sheet thermal variability. In Lehr operation, this can be implemented by setting the heaters at multiple intermediate levels during the cooling stage. The effectiveness of the multi-staged cooling is evaluated using full scale Lehr thermal model assuming mass production capacity. The significant reduction in the glass sheet temperature variability is achieved as shown in FIG. 21 in comparison with single stage cooling. The multistage cooling is carried out in four stages, and the heaters are controlled at 665° C., 590° C., 515° C. and 440° C., respectively. For the single stage cooling, the heater is set at 300° C. One tradeoff of multistage cooling is the cooling rate is lower, or longer time is required to achieve the target exit temperature. For the four-staged cooling as mentioned, the average cooling rate is 3.3° C., lower than 5.3° C. of the single stage cooling case.

In view of the above disclosure, the thermal uniformity of the glass stacks can be partially controlled by the configuration of the glass stack, the setters, and interlayers. In addition, the thermal uniformity of the glass stack can be partially controlled by the heating cycles used to heat the glass stack to the nucleation and growth temperatures. One or more of these controls may be used in ceramming cycles where tolerances for thermal uniformity are small, such as when it is desirable to control ΔT to be within ±5° C.

Figure 22:
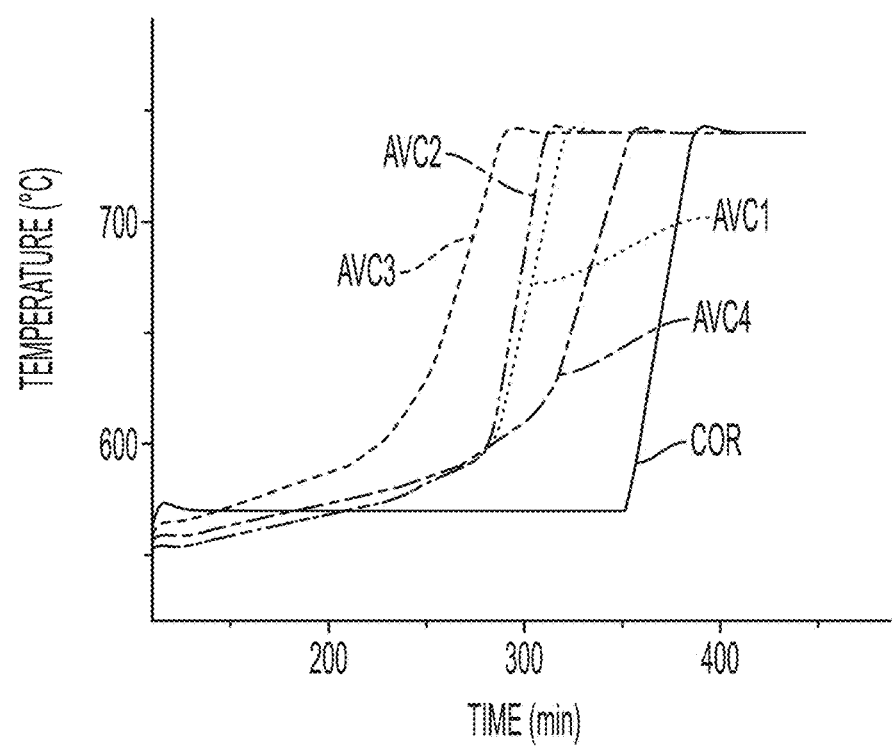
FIG. 22 graphically depicts temperature in degrees Celsius versus time in minutes of ceram cycles according to embodiments disclosed and described herein and conventional ceram cycles.

FIG. 22 shows a conventionally obtained ceramming cycle (labeled as COR) with two isothermal steps and a linear heating rate compared to AVC cycles for various target viscosities. As shown by the overlapping nucleation and growth steps, there is no isothermal step in the AVC method and the temperature increases at a relatively slower rate than the transitioning step. This also helps shorten the total ceramming duration.

Figure 23:
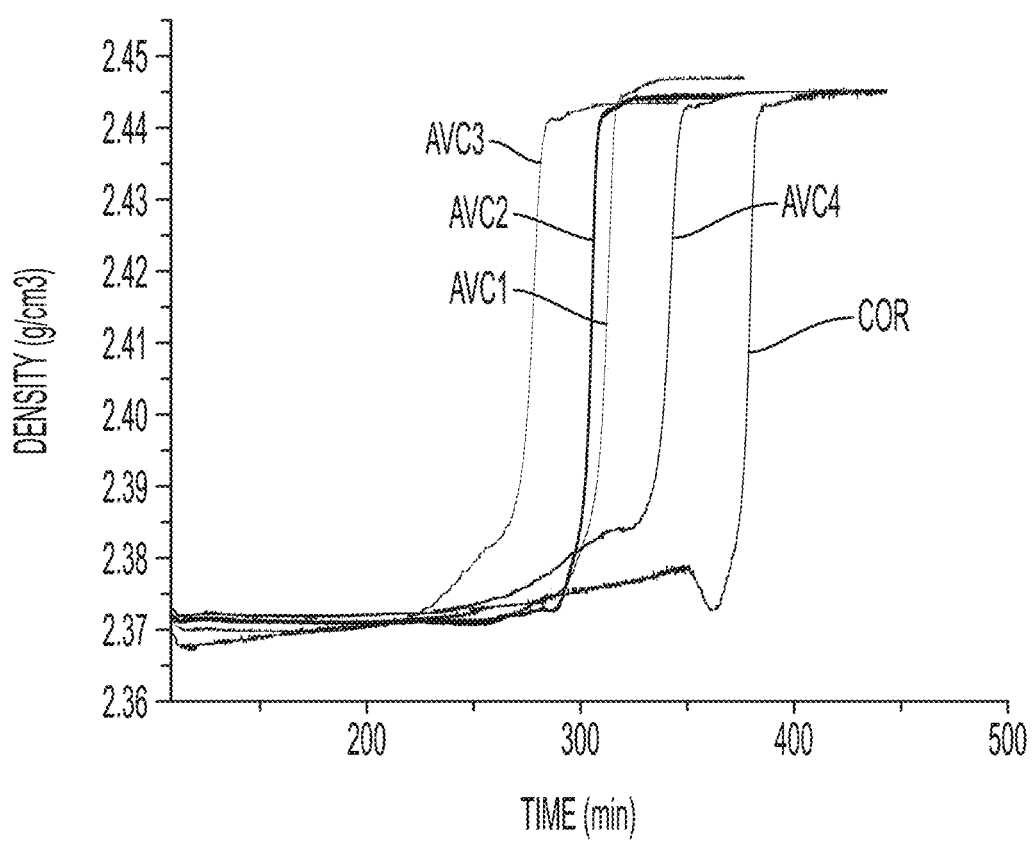
FIG. 23 graphically depicts density in grams per cubic centimeter versus time in minutes of ceram cycles according to embodiments disclosed and described herein and conventional ceram cycles.

FIG. 23 shows the evolution of density for the same conventional COR cycle and AVC cycles as shown in FIG. 22. As expected the density stays constant during the nucleation step, so minimum deformation/flow gradient is observed until the crystals start to grow. Then, the transition follows a smoother trend unlike the conventional method where an inevitable non-monotonic behavior is observed with a sudden drop in density.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for ceramming a glass article to a glass-ceramic comprising:
    placing a glass article into a heating space of a heating apparatus, the heating space having thermal uniformity throughout the heating space;
    heating the glass article within the heating space to a first hold temperature at a first predetermined heating rate;
    increasing or decreasing a temperature of the glass article within the heating space relative to the first hold temperature for a first predetermined duration by varying a heating space temperature, wherein viscosity of the glass article is maintained within log of viscosity ±1.0 poise of a target viscosity during the first predetermined duration, wherein the target viscosity is a constant;
    heating the glass article within the heating space from the first hold temperature to a second hold temperature at a second predetermined heating rate;
    holding the glass article at the second hold temperature for a second duration within the heating space, wherein density of the glass article is measured in-situ from the heating of the glass article from the first hold temperature through the second duration; and
    ending the second duration when an absolute value of a density rate of change of the glass article within the heating space is less than or equal to 0.10 (g/cm$^3$)/min.

2. The method of claim 1, wherein ending the second duration occurs when the absolute value of the density rate of change of the glass article is 0.00 (g/cm$^3$)/min.

3. The method of claim 1, wherein during the first predetermined duration, the viscosity of the glass article is maintained within log of viscosity ±0.1 poise of the target viscosity.

4. The method of claim 1, wherein a viscosity of the glass article is maintained within log of viscosity ±1.0 poise of the target viscosity during at least a portion of the heating the glass article from the first hold temperature to a second hold temperature.

5. The method of claim 1, wherein the viscosity of the glass article is maintained within log viscosity ±1.0 poise of the target viscosity during the first predetermined duration using data from an automatic viscosity control system.

6. The method of claim 1, wherein the density of the glass article is measured in-situ during the heating the glass article from the first hold temperature to a second hold temperature and the holding the glass article at the second hold temperature for a second duration.

7. The method of claim 6, wherein the density of the glass article is measured in-situ of the heating the glass article from the first hold temperature to a second hold temperature at a second predetermined heating rate and the holding the glass article at the second hold temperature for a second duration with a dilatometer.

8. The method of claim 1, wherein the second duration is ended when the density of the glass article is constant for at least 15 minutes.

9. The method of claim 1, wherein the second duration is ended when the density of the glass article is constant for at least 50 minutes.

10. The method of claim 1, wherein the first predetermined heating rate is determined based at least in part on performance of an automatic viscosity control system.

11. The method of claim 1, wherein the second predetermined heating rate is determined based at least in part on performance of an automatic viscosity control system.

12. The method of claim 1, further comprising applying a weight constraining force to the glass article.

13. The method of claim 1, wherein a temperature differential of the glass article from a programmed temperature within the first predetermined duration is within ±8° C.

14. The method of claim 1, wherein a temperature differential of the glass article from a programmed temperature within the second duration is within ±8° C.

15. The method of claim 1, wherein heating the glass article to a first hold temperature at a first predetermined heating rate comprises multistage heating.

16. The method of claim 1, wherein during the heating the glass article to a first hold temperature at a first predetermined heating rate, the viscosity of the glass article is maintained at greater than or equal to log viscosity 11.0 poise.

17. The method of claim 1, wherein during the first predetermined duration, the viscosity of the glass article is maintained at greater than or equal to log viscosity 11.0 poise.

18. The method of claim 1, wherein during the heating the glass article from the first hold temperature to the second hold temperature, the viscosity of the glass article is maintained at greater than or equal to log viscosity 11.0 poise.

19. The method of claim 1, wherein the viscosity of the glass article is maintained at greater than or equal to log viscosity 11.0 poise for the entire duration of the method.

20. The method of claim 1, wherein during the first predetermined duration, the viscosity of the glass article is maintained at less than log viscosity 11.0 poise.

* * * * *